United States Patent
Nagai

(10) Patent No.: US 8,485,940 B2
(45) Date of Patent: Jul. 16, 2013

(54) POWER CONTROL DEVICE

(75) Inventor: Tadayuki Nagai, Susono (JP)

(73) Assignee: Toyota Jidosha Kabushiki Kaisha, Toytoa (JP)

( * ) Notice: Subject to any disclaimer, the term of this patent is extended or adjusted under 35 U.S.C. 154(b) by 131 days.

(21) Appl. No.: 13/263,950

(22) PCT Filed: Apr. 14, 2009

(86) PCT No.: PCT/JP2009/057515
§ 371 (c)(1),
(2), (4) Date: Oct. 11, 2011

(87) PCT Pub. No.: WO2010/119510
PCT Pub. Date: Oct. 21, 2010

(65) Prior Publication Data
US 2012/0035017 A1   Feb. 9, 2012

(51) Int. Cl.
F02D 23/00   (2006.01)
(52) U.S. Cl.
USPC .............................................. 477/32; 477/33
(58) Field of Classification Search
USPC ....................................................... 477/32, 33
See application file for complete search history.

(56) References Cited

U.S. PATENT DOCUMENTS 5,125,292 A * 6/1992 Matsuoka et al. ............. 477/33
5,580,329 A * 12/1996 Hayashi ......................... 477/33
7,200,483 B1 * 4/2007 Kavadeles .................... 701/100

FOREIGN PATENT DOCUMENTS

| EP | 1 830 110 A1 | 9/2007 |
|---|---|---|
| JP | A-59-190550 | 10/1984 |
| JP | A-7-156691 | 6/1995 |
| JP | A-2002-52951 | 2/2002 |
| JP | A-2003-39990 | 2/2003 |
| JP | A-2004-293442 | 10/2004 |
| JP | A-2005-194945 | 7/2005 |
| JP | WO2006/059735 A1 | 6/2006 |
| JP | A-2006-300171 | 11/2006 |
| JP | A-2007-2887 | 1/2007 |

OTHER PUBLICATIONS

International Search Report dated May 19, 2009 in International Application No. PCT/JP2009/057515 (with translation).

* cited by examiner

*Primary Examiner* — Edwin A Young
(74) *Attorney, Agent, or Firm* — Oliff & Berridge, PLC

(57) ABSTRACT

A power control device includes: an engine control unit and a transmission control unit provided so as to control power of the engine, and configured such that if an actual operating point, which is an operating point indicating a combination of actual revolution speed and torque of the engine, is located in a non-supercharging region and a final target operating point, which serves as a target operating point during acceleration, is located in a supercharging region, the revolution speed of the engine is increased until the actual operating point is shifted into the supercharging region, and the revolution speed of the engine is decreased after the actual operating point has entered the supercharging region, thereby shifting the actual operating point into the final target operating point when accelerating the vehicle.

8 Claims, 12 Drawing Sheets

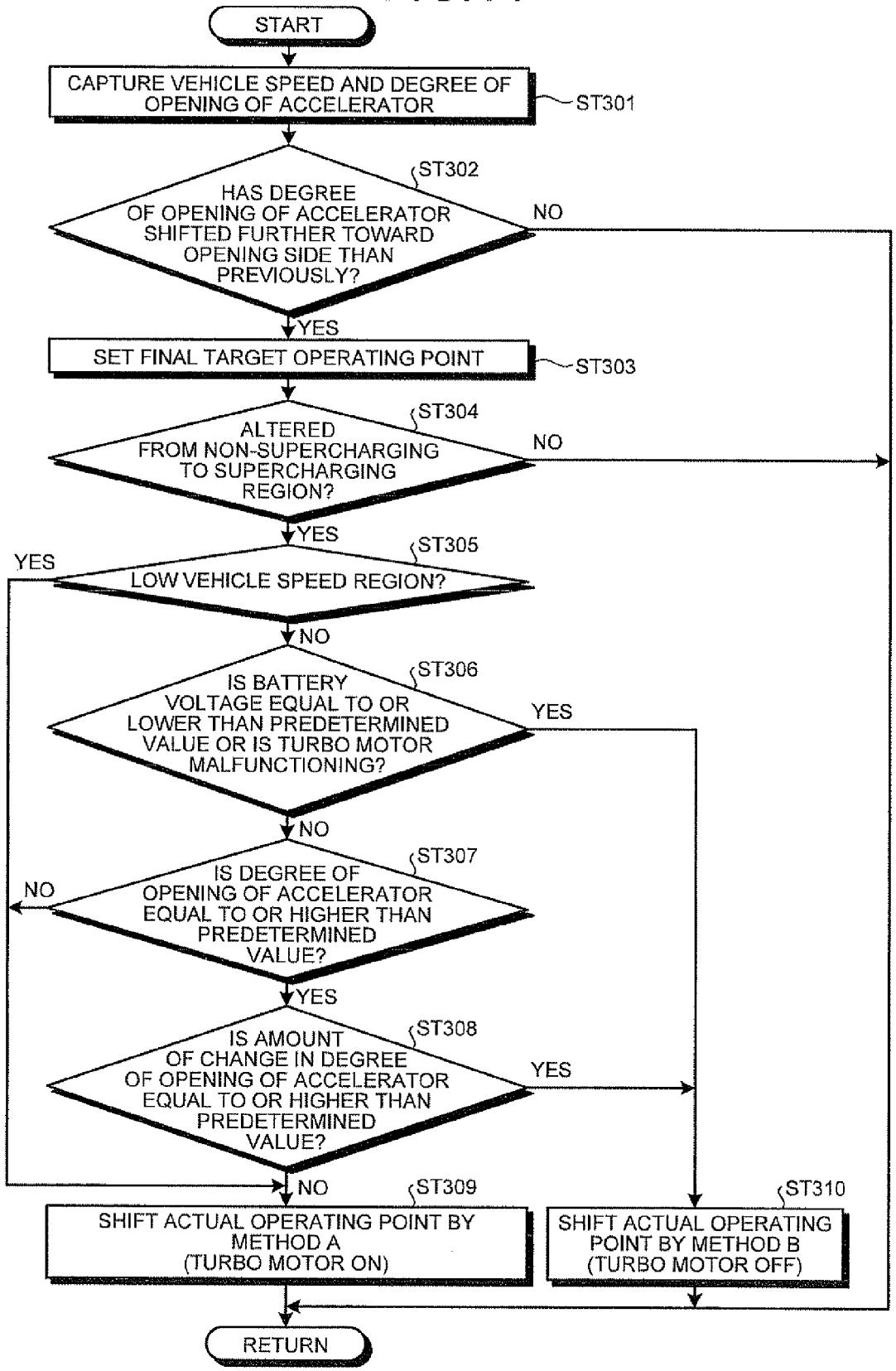

POWER CONTROL DEVICE

FIELD

The present invention relates to a power control device. In particular, the present invention relates to the power control device provided for a vehicle that includes an engine with a turbocharger and an automatic transmission.

BACKGROUND

In general, an engine of internal combustion type is commonly used in a vehicle as a power source for running. In recent years, a continuously variable transmission has increasingly been used as a transmission for transmitting power generated by an engine to the driving wheels. Such an engine and continuously variable transmission are controlled by a power control device, which controls them when the vehicle is running. Such a power control device exerts operating control for an engine and transmission control for a continuously variable transmission according to driving operations performed by a driver and the current running state of the vehicle.

For example, in the control apparatus for a vehicle that includes a continuously variable transmission, described in the Patent Literature 1, a target driving force is calculated from the degree of opening of an accelerator or vehicle speed, and a target output is based on this driving force. Thus, the final target operating point, which is a combination of the target revolution speed and target torque of the engine is calculated. This final target operating point is an operating point determined taking fuel consumption into account among operating points capable of actualizing the target driving force. Moreover, a transition operating point, which is a combination of the revolution speed and torque of the engine attainable within a predetermined period from the present, is calculated based on, for example, the degree that supercharged pressure applied by a supercharger provided for the engine increases.

Moreover, when the transition operating point thus calculated has reached an operating point that is located on the output contour line passing through the final target operating point but that has not reached this final target operating point, the torque and revolution speed of the engine are shifted so that the operating point reaches the final target operating point along the output contour line. That is, the operating point is shifted by controlling the engine torque and controlling the transmission ratio of a continuously variable transmission so that the operating point on the output contour line reaches the final target operating point. Thus, revolution speed and torque of the engine can be increased to the maximum within the attainable range, and the operating point can reliably be caused to reach the final target operating point, thus reducing delay in acceleration of the vehicle.

Patent Literature 1: Japanese Patent Application Laid-open No. 2003-39990

SUMMARY

Technical Problem

However, in the case of an engine with turbocharger, there exists a non-supercharging region that is operational but where supercharging is not performed. When the operating point that is a combination of revolution speed and torque of the engine is located in this non-supercharging region, it is difficult to increase supercharged pressure. For this reason, if the current operating point is located in the non-supercharging region, engine torque during acceleration is liable to rise slowly as a result of the difficulty in increasing supercharged pressure. In this case, the time taken during acceleration for the operating point to reach the final target operating point lengthens, resulting in a delay in obtaining power capable of generating required driving force. For this reason, time taken to begin actual acceleration after acceleration has been required is liable to lag.

Moreover, even in the non-supercharging region, engine revolution speed can be raised by increasing the transmission ratio of a continuously variable transmission. Therefore, power capable of actualizing required driving force may be generated by raising engine revolution speed. However, in this case, since fuel consumption is not taken into account, fuel consumption is likely to worsen. If acceleration of the vehicle is required when the operating point is located in the non-supercharging region as described above, a delay would occur in actual acceleration and fuel consumption would worsen if acceleration were carried out rapidly.

The present invention has been proposed in view of the foregoing problem, and it is an object of the present invention to provide a power control device in which securing driving force during acceleration of the vehicle that uses, as a power source, an engine with a turbocharger can be made compatible with suppressing degradation in fuel consumption.

Solution to Problem

In order to solve the above mentioned problem and achieve the object, a power control device according to the present invention includes an engine provided as a power source for running a vehicle, equipped with a supercharger, and capable of supercharging using the supercharger; and a power control means provided so as to control power of the engine and configured such that if an actual operating point, which is an operating point indicating a combination of actual revolution speed and torque of the engine, is located in a non-supercharging region and if a target operating point, which serves as a target operating point during acceleration, is located in a supercharging region, the revolution speed of the engine is increased until the actual operating point is shifted into the supercharging region, and the revolution speed of the engine is decreased after the actual operating point has entered the supercharging region, thereby shifting the actual operating point into the target operating point when accelerating the vehicle, the non-supercharging region being a region where supercharging is not carried out in an operation region for the engine, and the supercharging region being a region capable of actualizing supercharging with the supercharger in the operation region of the engine.

In addition, the power control device according to the present invention further includes an automatic transmission configured to change speed of power generated by the engine and output resultant power to driving wheels of the vehicle, wherein the power control means shifts the actual operating point by controlling the revolution speed of the engine through controlling a transmission ratio for the automatic transmission while controlling the power of the engine.

In addition, in the power control device according to the present invention, the power control means shifts the actual operating point to a point where a power contour line and a boundary between the non-supercharging and supercharging region intersect each other, by increasing the revolution speed of the engine, and then the actual operating point is shifted to the target operating point by decreasing the revolution speed of the engine, the power contour line being a line indicating the revolution speed and torque of the engine that actualize power equal to power at the target operating point.

In addition, in the power control device according to the present invention, if the revolution speed of the engine is equal to or higher than a permissible-noise revolution speed when the engine revolution speed is increased when the actual operating point is located in the non-supercharging area, the power control means increases the engine torque with the engine revolution speed set to the permissible-noise revolution speed or lower, thereby shifting the actual operating point onto the power contour line indicating the revolution speed and torque of the engine that actualize power equal to the power at the target operating point, and then shifts the actual operating point to the target operating point, the permissible-noise revolution speed being an upper limit of a revolution speed capable of permitting noise that may increase with an increase in revolution speed of the engine.

In addition, in the power control device according to the present invention, if a supercharged pressure has become equal to or higher than a required supercharged pressure when the engine revolution speed is being increased with the actual operating point located in the non-supercharging area, the power control means increases the torque of the engine while maintaining the engine revolution speed at the actual operating point when the supercharged pressure has become equal to or higher than the required supercharged pressure, thereby shifting the actual operating point onto the power contour line indicating the revolution speed and torque of the engine that actualize power equal to the power at the target operating point, and then shifts the actual operating point to the target operating point, the supercharged pressure being pressure of air taken into engine when supercharging is carried out with the supercharger, and the required supercharged pressure being the supercharged pressure required to generate the engine torque at the target operating point.

In addition, in the power control device according to the present invention, the supercharger is provided so as to be operable by electricity, wherein if the actual operating point is located in the non-supercharging region and an amount of change in degree of opening of an accelerator pedal during the acceleration is small, the power control means operates the supercharger by electricity and increases the engine torque, thereby shifting the actual operating point to the target operating point, and wherein if the actual operating point is located in the non-supercharging region and the amount of change in degree of opening of the accelerator pedal during the acceleration is large, the power control means increases the engine revolution speed until the actual operating point shifts into the supercharging region.

Advantageous Effects of Invention

A power control device according to the present invention yields the effect that securing driving force during acceleration of a vehicle that uses, as a power source, an engine with a turbocharger can be made compatible with suppressing degradation in fuel consumption.

BRIEF DESCRIPTION OF DRAWINGS

FIG. 14 is a flowchart illustrating the processing procedure in the power control device according to the third embodiment.

REFERENCE SIGNS LIST 1, 90, 100 POWER CONTROL DEVICE
5 ENGINE
7 ENGINE REVOLUTION SPEED SENSOR
15, 101 TURBO CHARGER
23 PRESSURE SENSOR
30 AUTOMATIC TRANSMISSION
35 CONTINUOUSLY VARIABLE TRANSMISSION
45 CONTINUOUSLY VARIABLE TRANSMISSION INPUT SHAFT REVOLUTION SPEED SENSOR
46 CONTINUOUSLY VARIABLE TRANSMISSION OUTPUT SHAFT REVOLUTION SPEED SENSOR
50 HYDRAULIC CONTROL DEVICE
57 DRIVING WHEEL
60 ACCELERATOR PEDAL
61 ACCELERATOR OPENING DEGREE SENSOR
70 ECU
71 PROCESSING UNIT
72 ACCELERATOR OPENING DEGREE CAPTURING UNIT
73 INTAKE AIR AMOUNT CAPTURING UNIT
74 ENGINE REVOLUTION SPEED CAPTURING UNIT
75 VEHICLE SPEED CAPTURING UNIT
76 SUPERCHARGED PRESSURE CAPTURING UNIT
77 ACCELERATOR OPENING DEGREE DETERMINING UNIT
78 OPERATION REGION DETERMINING UNIT
79 ENGINE REVOLUTION SPEED DETERMINING UNIT
80 ENGINE CONTROL UNIT
81 TRANSMISSION CONTROL UNIT
88 STORAGE UNIT
89 INPUT/OUTPUT UNIT

91 OPERATING POINT DETERMINING UNIT
92 SUPERCHARGED PRESSURE DETERMINING UNIT
104 TURBO MOTOR
110 VEHICLE SPEED DETERMINING UNIT
111 BATTERY VOLTAGE DETERMINING UNIT
112 TURBO MOTOR CONDITION DETERMINING UNIT

DESCRIPTION OF EMBODIMENTS

Embodiments of a power control device according to the present invention will be described in detail below with reference to the drawings. It is to be understood that the present invention is not limited to these embodiments. Also, it is to be understood that compositional elements in the embodiments described below include ones replaceable with other compositional elements by those skilled in the art or ones substantially identical to these compositional element.

First Embodiment

Figure 1:
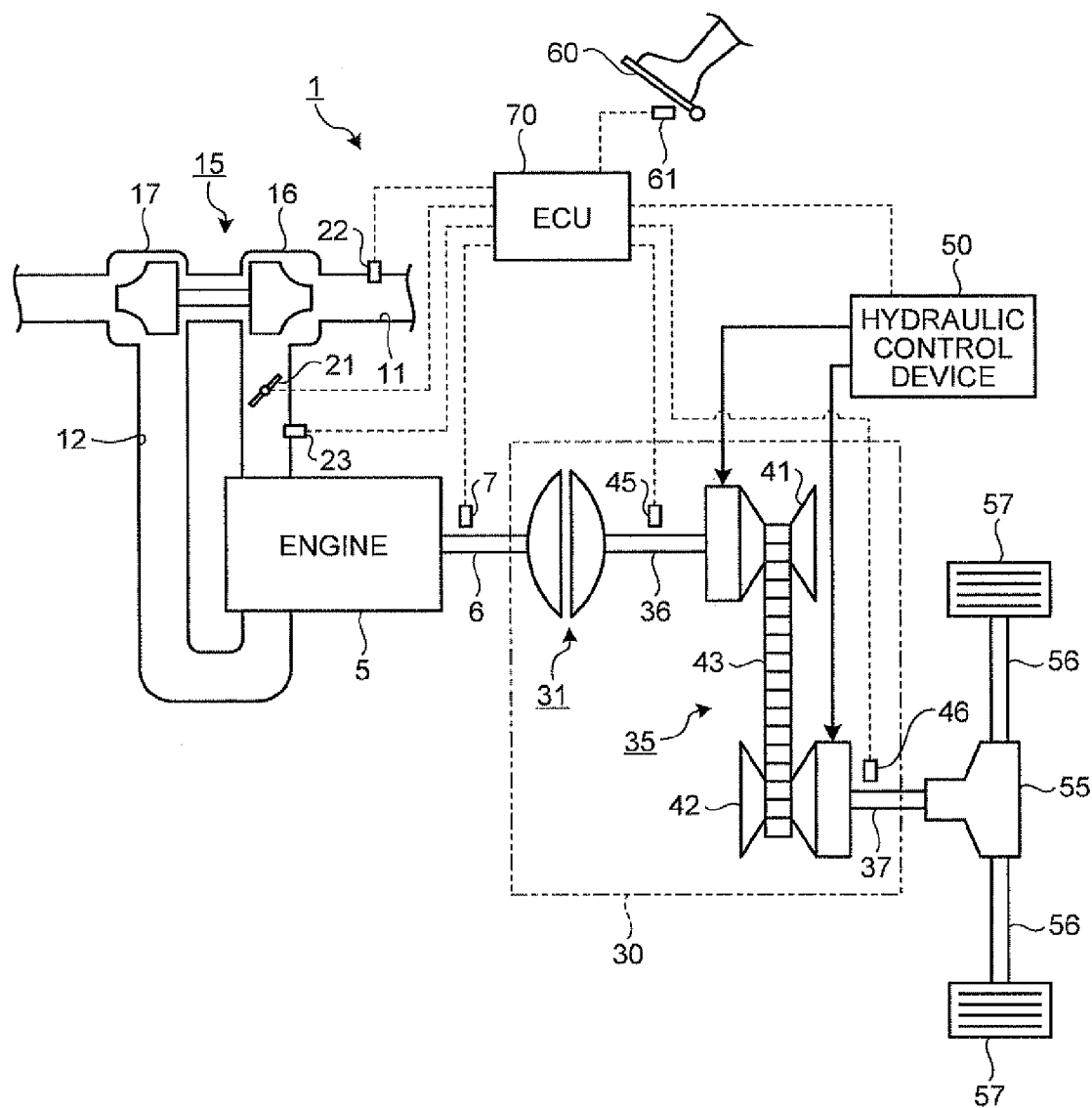
FIG. 1 is a schematic view of a power control device according to a first embodiment of the present invention.

FIG. 1 is a schematic view of a power control device according to a first embodiment of the present invention. The power control device according to the first embodiment is provided for the control of power generated by an engine 5, which is an internal combustion engine mounted in a vehicle (not illustrated) as a power source for running the vehicle and the transmission control for an automatic transmission 30, which changes the speed of power generated by the engine 5 and transmits the resultant power to driving wheels 57 of the vehicle. In this case, the engine 5 is a gasoline-fueled spark ignition type internal combustion engine with reciprocating system. Also, it should be understood that the engine 5 is not limited to this. The engine 5 may be, for example, a spark ignition type internal combustion engine fueled by LPG (Liquefied Petroleum Gas) or alcohol. Alternatively, the engine 5 may be a so-called spark ignition type internal combustion engine with rotary system or may be a diesel engine. The engine 5 is connected to an ECU (Electronic Control Unit) 70, which is capable of controlling the revolution speed and torque.

Connected to the engine 5 thus provided are an intake passage 11, communicating with the combustion chamber (not illustrated) of the engine 5, through which air taken into the combustion chamber flows; and an exhaust passage 12 through which exhaust gas ejected from the combustion chamber as a result of fuel burning in the combustion chamber flows. Additionally, the engine 5 includes a turbocharger 15, which is a supercharger for compressing air taken into the combustion chamber. A compressor 16 and a turbine 17 of the turbocharger 15 are disposed in the intake passage 11 and the exhaust passage 12, respectively. In the turbocharger 15, the turbine 17 is operated by exhaust gas flowing in the exhaust passage 12, in which this turbine 17 is disposed. The force of the turbine 17 thus being actuated is transmitted to the compressor 16, with the result that this compressor 16 is then actuated, thereby compressing air flowing in the intake passage 11.

Disposed in the intake passage 11 where the compressor 16 of the turbocharger 15 is disposed is a throttle valve 21, which is capable of opening/closing the inside of the intake passage 11 and serves as a means for adjusting the amount of intake air. This throttle valve 21 is disposed downstream of the compressor 16 in the direction in which air flows in the intake passage 11. Also disposed in the intake passage 11 but upstream of the compressor 16 is an air flow meter 22, serving as a means for detecting the amount of intake air, which is capable of detecting the rate of air flow in the intake passage 11. Disposed downstream of the throttle valve 21 is a pressure sensor 23, serving as an intake pressure detecting means, which detects the pressure of air flowing in the intake passage 11. Additionally, the engine 5 is provided with an engine revolution speed sensor 7, serving as a means for detecting revolution speed of the engine, which is capable of detecting the number of revolutions of an engine output shaft 6.

The automatic transmission 30 includes a torque converter 31, a continuously variable transmission 35, and a hydraulic control device 50. The torque converter 31 is connected to the engine output shaft 6 and a continuously variable transmission input shaft 36, which is the input shaft of the continuously variable transmission 35. The torque converter 31 is capable of amplifying the torque transmitted from the engine 5. This torque converter 31 is of known type with a lockup mechanism.

The continuously variable transmission 35 connected to the torque converter 31 by the continuously variable transmission input shaft 36 is provided such that the power of the engine 5 transmitted to the torque converter 31 can be transmitted to this continuously variable transmission 35 via the torque converter 31. When the power of the engine 5 is transmitted to the continuously variable transmission 35, this continuously variable transmission 35 can modify the revolution speed at a transmission ratio selected according to the running conditions of a vehicle and can output the torque modified in speed to the driving wheels 57 of the vehicle.

A continuously variable transmission output shaft 37, i.e., the output shaft of the continuously variable transmission 35, is connected to a differential device 55 via power transmission path (not illustrated) such as other rotation shafts. Specifically, the continuously variable transmission output shaft 37 is the output shaft for the automatic transmission 30, and the differential device 55 to which the continuously variable transmission output shaft 37 is connected via the power transmission path is further connected to the driving wheels 57 of the vehicle via corresponding drive shafts 56. Accordingly, power of the engine 5 transmitted to the automatic transmission 30 can be transmitted to the driving wheels 57 via the differential device 55 and the drive shafts 56.

The continuously variable transmission 35 is a so-called belt-type continuously variable transmission that uses an annular belt 43 for torque transmission. This continuously variable transmission 35 has a primary pulley 41 and a secondary pulley 42, and a belt 43 is wound around and between the primary pulley 41 and the secondary pulley 42. Torque can be transmitted between the primary and secondary pulleys 41 and 42 via this belt 43.

Each of the primary and secondary pulleys 41 and 42 has a pair of sheaves disposed on both sides of the belt 43 in the widthwise direction of this belt 43 such that the distance between the corresponding pair of sheaves can be altered. Further, connected to the primary and secondary pulleys 41 and 42 is the hydraulic control device 50 capable of applying oil pressure to these pulleys. The hydraulic control device 50 adjusts oil pressures applied to the corresponding pairs of pulleys, thereby changing the distances between the corresponding pairs of sheaves. Thus, when the distance between these pairs of sheaves changes, the radius of the rotation of the belt 43 wound around and between the pulleys changes.

By thus changing the radius of rotation of the belt 43 wound around and between the pulleys, the continuously variable transmission 35 can change the rotation ratio for the transmission of torque between the primary and secondary pulleys 41 and 42, that is, the transmission ratio. Additionally, the continuously variable transmission input shaft 36 is connected to the primary pulley 41 whereas the continuously variable transmission output shaft 37 is connected to the secondary pulley 42. Thus, the continuously variable transmission 35, or the automatic transmission 30, is capable of outputting power generated by the engine 5 to the driving wheels 57 of a vehicle by altering the transmission ratio.

Additionally, the automatic transmission 30 is provided with: a continuously variable transmission input shaft revolution speed sensor 45, which serves as a continuously variable transmission input shaft revolution speed detecting means capable of detecting the revolution speed of the continuously variable transmission input shaft 36; and a continuously variable transmission output shaft revolution speed sensor 46, which serves as a continuously variable transmission output shaft revolution speed detecting means capable of detecting the revolution speed of the continuously variable transmission output shaft 37.

The continuously variable transmission input shaft revolution speed sensor 45, the continuously variable transmission output shaft revolution speed sensor 46, the engine revolution speed sensor 7, the throttle valve 21, the air flow meter 22, the pressure sensor 23, the hydraulic control device 50 are connected to the ECU 70. Also connected to the ECU 70 is an accelerator opening degree sensor 61, serving as an accelerator opening degree detecting means, which is disposed near an accelerator pedal 60 provided near the driver's seat of the vehicle, and which is capable of detecting an accelerator opening degree, i.e., the position of the accelerator pedal 60.

Figure 2:
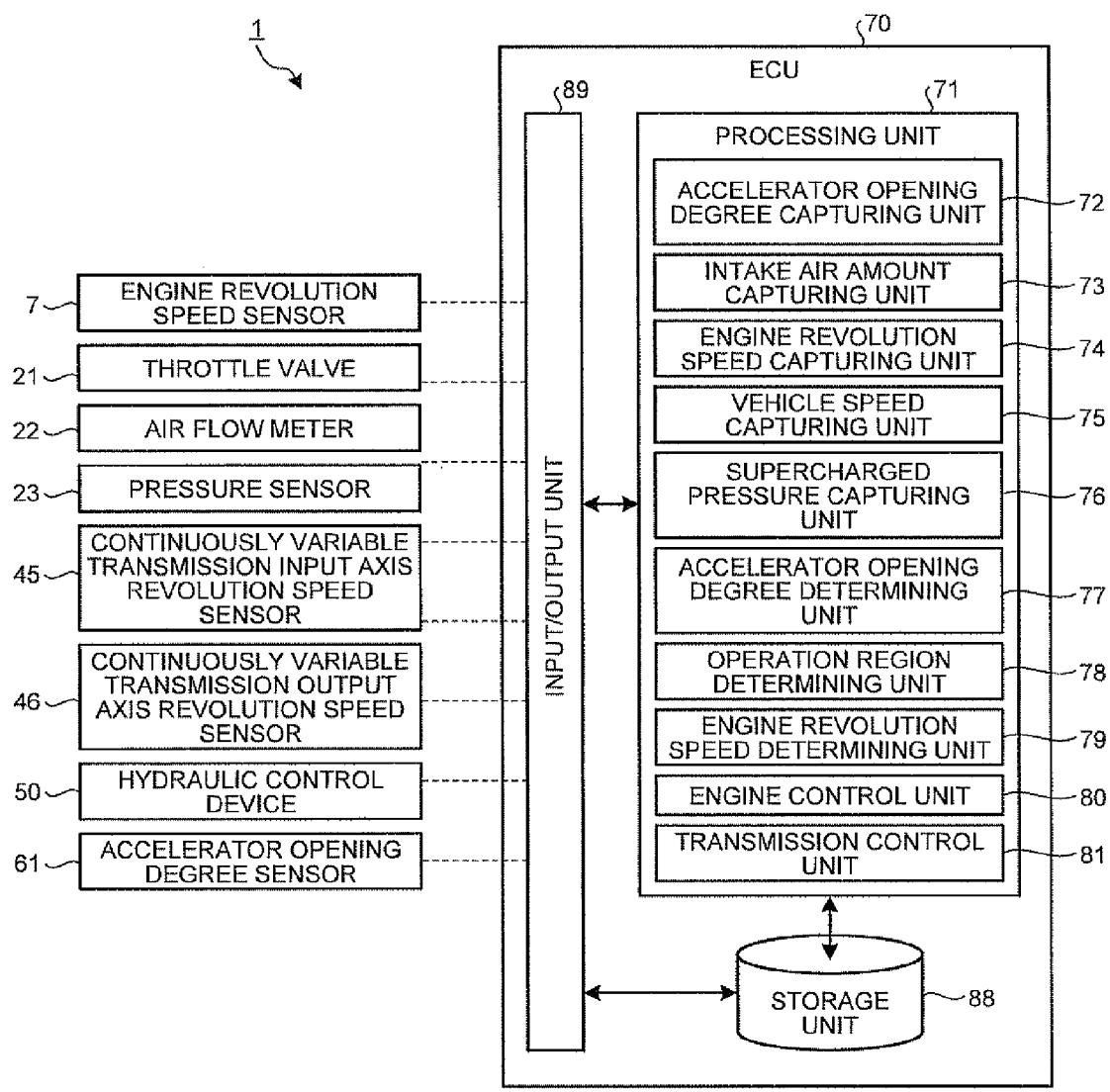
FIG. 2 is a diagram of the configuration of the main part of the power control device illustrated in FIG. 1.

FIG. 2 is a diagram of the configuration of the main part of the power control device illustrated in FIG. 1. The ECU 70 includes a processing unit 71, a storage unit 88 and an input/output portion 89. These are connected to one another to receive/transmit signals. The engine revolution speed sensor 7, the throttle valve 21, the air flow meter 22, the pressure sensor 23, and the continuously variable transmission input shaft revolution speed sensor 45, and the continuously variable transmission output shaft revolution speed sensor 46, the hydraulic control device 50, and the accelerator opening degree sensor 61, all of which are connected to the ECU 70, are connected to the input/output unit 89. The input/output unit 89 inputs/outputs signals between itself and the engine revolution speed sensor 7 and so on. The storage unit 88 stores a computer program for controlling a power control device 1. The storage unit 88 may include a nonvolatile memory (i.e., read-only recording medium such as a CD-ROM), such as a hard disk device, optical magnetic disk device, or flash memory, or a volatile memory, such as a RAM (Random Access Memory). Alternatively, the storage unit 88 may include a combination thereof.

The processing unit 71 includes a memory and a CPU (Central Processing Unit). The processing unit 71 has at least: an accelerator opening degree capturing unit 72, serving as an accelerator opening degree capturing means, which is capable of capturing an accelerator opening degree, i.e., the degree of opening of the accelerator pedal 60, from the detection result of the accelerator opening degree sensor 61; an intake air amount capturing unit 73, serving as an intake air amount capturing means, which is capable of capturing the amount of intake air in the engine 5 from the detection result of the air flow meter 22; an engine revolution speed capturing unit 74, serving as an engine revolution speed capturing means, which captures the revolution speed of the engine from the detection result of the engine revolution speed sensor 7; a vehicle speed capturing unit 75, serving as a vehicle speed capturing means, which captures a vehicle speed from the detection result of the continuously variable transmission output shaft revolution speed sensor 46; and a supercharged pressure capturing unit 76, serving as a supercharged pressure capturing means, which captures supercharged pressure supplied by the turbocharger 15, from the detection result of the pressure sensor 23.

The processing unit 71 also includes: an accelerator opening degree determining unit 77, serving as an accelerator opening degree determining means, which determines changes in the accelerator opening degree based on the accelerator opening degree captured by the accelerator opening degree capturing unit 72; a operation region determining unit 78, serving as an engine operation region determining means, which determines the operation region of the engine 5; an engine revolution speed determining unit 79, serving as an engine revolution speed determining means, which compares the revolution speed of the engine 5 with a predetermined threshold value, and determines a relation with that threshold value; an engine control unit 80, serving as an internal combustion control means, which controls the running of the engine 5; and a transmission control unit 81, serving as a transmission control means, which controls the transmission ratio of the continuously variable transmission 35 by controlling the oil pressure applied to the primary and secondary pulleys 41 and 42 by the hydraulic control device 50.

The ECU 70 controls the power control device 1 such that, for example, based on the detection results of the engine revolution speed sensor 7, etc., the processing unit 71 reads the computer program into the memory incorporated in the processing unit 71, then performs an operation, and actuates the hydraulic control device 50, etc., according to the result of the operation. At this time, if necessary, the processing unit 71 stores a half-operated numerical value into the storage unit 88 or takes out a stored numerical value and performs an operation. Where the power control device 1 is controlled in such a manner, this may be controlled by dedicated hardware other than the ECU 70 instead of the computer program.

The power control device 1 according to the first embodiment has the foregoing configuration, and the operation of the power control device 1 will now be described. During the running of a vehicle, the accelerator pedal 60 is operated with a foot to adjust the revolution speed and torque of the engine 5 and hence vehicle speed. While the accelerator pedal 60 is operated in such a manner, the accelerator opening degree sensor 61, disposed near the accelerator pedal 60, detects the degree of depression of the accelerator pedal 60, or accelerator opening degree. The detection result of the accelerator opening degree sensor 61 is transmitted to and captured by the accelerator opening degree capturing unit 72 of the processing unit 71 of the ECU 70. The accelerator opening degree captured by the accelerator opening degree capturing unit 72 is transmitted to the engine control unit 80 of the processing unit 71 of the ECU 70. Based on the transmitted accelerator opening degree and the detection results of the other sensors, the engine control unit 80 actuates the throttle valve 21, etc., thereby controlling the engine 5.

Additionally, while the engine control unit 80 controls the running of the engine 5, the amount of intake air flowing in the intake passage 11 is detected by an air flow meter 22, and this detection result is transmitted to and captured by the intake air amount capturing unit 73 of the processing unit 71 of the ECU 70. The amount of intake air captured by the intake air amount capturing unit 73 is transmitted to the engine control unit 80, which controls the running of the engine 5 while detecting the operational status of the engine 5 from the amount of intake air, etc.

The compressor 16 of the turbocharger 15 is disposed in the intake passage 11. This compressor 16 is provided such as to be actuated by force generated when the turbine 17 of the turbocharger 15 is actuated by exhaust gas expelled from the engine 5. Therefore, the turbine 17 is operated by exhaust gas expelled from the engine 5 when the engine 5 reaches the operational status that makes it possible to actuate the turbine 17 by means of exhaust gas. The compressor 16 is accordingly actuated by the actuation of the turbine 17. Upon actuation, the compressor 16 takes air present upstream of the compressor 16 in the direction in which air flows in the intake passage 11, then compresses this air, and causes it to flow downstream. As a result, air at higher than atmospheric pressure flows downstream of the compressor 16 in the intake passage 11 when the turbocharger 15 is actuated. Air at pressure thus increased is adjusted in flow rate by the throttle valve 21, which is disposed downstream of the compressor 16 and adjusted in position by the engine control unit 80. The air is then supplied to the engine 5. That is, when the turbocharger 15 is actuated, the engine 5 takes in air supercharged by the turbocharger 15.

The pressure of air, such as that supercharged by the turbocharger 15, flowing in the intake passage 11 is detected by the pressure sensor 23 provided in the intake passage 11. The pressure of air in the intake passage 11, detected by the pressure sensor 23, is transmitted to the supercharged pressure capturing unit 76 of the processing unit 71 of the ECU 70, and is captured by this supercharged pressure capturing unit 76 as supercharged pressure.

The engine 5 can be run in such a manner by its being controlled by the engine control unit 80. The power of the engine 5 controlled by the engine control unit 80 is output to the outside by the rotation of the engine output shaft 6. The rotation of the engine output shaft 6 is first transmitted to the torque converter 31, which consequently rotates. The rotation of the engine output shaft 6 is thus transmitted to the continuously variable transmission input shaft 36 via the torque converter 31.

The rotation of the engine output shaft 6 transmitted to the continuously variable transmission input shaft 36 via the torque converter 31 is transmitted to the continuously variable transmission 35 via the continuously variable transmission input shaft 36. Consequently, the power of the engine 5 is input to the continuously variable transmission 35. In this case, since the torque converter 31 is capable of lockup by virtue of the lockup mechanism, the form of transmission differs depending on whether the torque converter 31 is in a lockup state or not when the power of the engine 5 is input to the continuously variable transmission via the torque converter 31.

Specifically, when the torque converter 31 is not in a lockup state, power is transmitted to the continuously variable transmission 35 via the torque converter 31 by a fluid transmission. Conversely, when the torque converter 31 is in a lockup state, power is mechanically transmitted to the continuously variable transmission 35 via the torque converter 31 by the lockup mechanism. As described above, power transmitted to the torque converter 31 from the engine 5 is input to the continuously variable transmission 35 via the torque converter 31 through fluid transmission or mechanical transmission depending on whether the torque converter 31 is in a lockup state.

The power of the engine 5 thus input to the continuously variable transmission 35 from the continuously variable transmission input shaft 36 via the torque converter 31 is modified in revolution speed and torque magnitude by the primary pulley 41, the secondary pulley 42, and the belt 43 of the continuously variable transmission 35, and then output from the continuously variable transmission output shaft 37 of the continuously variable transmission 35. This continuously variable transmission output shaft 37 is connected to the differential device 55 via a power transmission path, and the differential device 55 is connected to the driving wheels 57 via the drive shaft 56. Accordingly, power output from the continuously variable transmission output shaft 37 is transmitted to the driving wheels 57 via the differential device 55, etc. Thus, the driving wheels 57 rotate and the vehicle runs.

During the running of the vehicle, the transmission control unit 81 of the processing unit 71 of the ECU 70 controls the automatic transmission 30 such that transmission control is exerted according to the operational status state of the vehicle. Specifically, during the running of the vehicle, the revolution speed of the engine output shaft 6 is detected by the engine revolution speed sensor 7, and the result of the detection is transmitted to and captured by the engine revolution speed capturing unit 74 of the processing unit 71 of the ECU 70. During the running of the vehicle, the revolution speed of the continuously variable transmission output shaft 37 is also detected by the continuously variable transmission output shaft revolution speed sensor 46. This continuously variable transmission output shaft 37 and the driving wheels 57 have a constant transmission ratio. Detecting the revolution speed of the continuously variable transmission output shaft 37 makes it possible to estimate the revolution speed of the driving wheels 57 and hence the vehicle speed. Therefore, the continuously variable transmission output shaft revolution speed sensor 46 is provided as a vehicle speed detecting means, which is capable of detecting vehicle speed through the detection of the revolution speed of the continuously variable transmission output shaft 37. The revolution speed of the continuously variable transmission output shaft 37 detected by the continuously variable transmission output shaft revolution speed sensor 46 is transmitted to the vehicle speed capturing unit 75 of the processing unit 71 of the ECU 70. The vehicle speed capturing unit 75 performs a predetermined calculation, thereby capturing the result as a vehicle speed.

The transmission control unit 81 controls the hydraulic control device 50 according to, for example, engine revolution speed and vehicle speed captured by the engine revolution speed capturing unit 74 and vehicle speed capturing unit 75, respectively, thereby controlling oil pressure applied to the primary pulley 41 and the secondary pulley 42. Thereby, the radius of rotation of the belt 43 wound around and between the primary and secondary pulleys 41 and 42 is changed to alter a transmission ratio between the primary and secondary pulleys 41 and 42. The continuously variable transmission 35 alters the transmission ratio between the primary and secondary pulleys 41 and 42 in such a manner, thereby changing the speed of the rotation of the engine 5, which has been input to the continuously variable transmission input shaft 36, and outputs the rotation of the engine 5 from the continuously variable transmission output shaft 37.

The continuously variable transmission 35 can modify a transmission ratio in such a manner. Specifically, to set a transmission ratio to a low-speed side, the radius of rotation of the belt 43 wound around and between the primary pulley 41 is decreased whereas the radius of rotation of the belt 43 wound around and between the secondary pulley 42 is increased. Thereby, the transmission ratio between the primary pulley 41 and the secondary pulley 42 increases, thus setting a transmission ratio for low-speed side. Accordingly, the driving force generated in the driving wheels 57 increases. Conversely, to set a transmission ratio for high-speed side, the radius of rotation of the belt 43 wound around the primary pulley 41 is increased whereas the radius of rotation of the belt 43 wound around the secondary pulley 42 is decreased.

Thereby, the transmission ratio between the primary pulley 41 and the secondary pulley 42 decreases, thus setting a transmission ratio for high-speed side. Accordingly, the rotating speed of the driving wheels 57 becomes high, and high speed running becomes possible.

Figure 3:
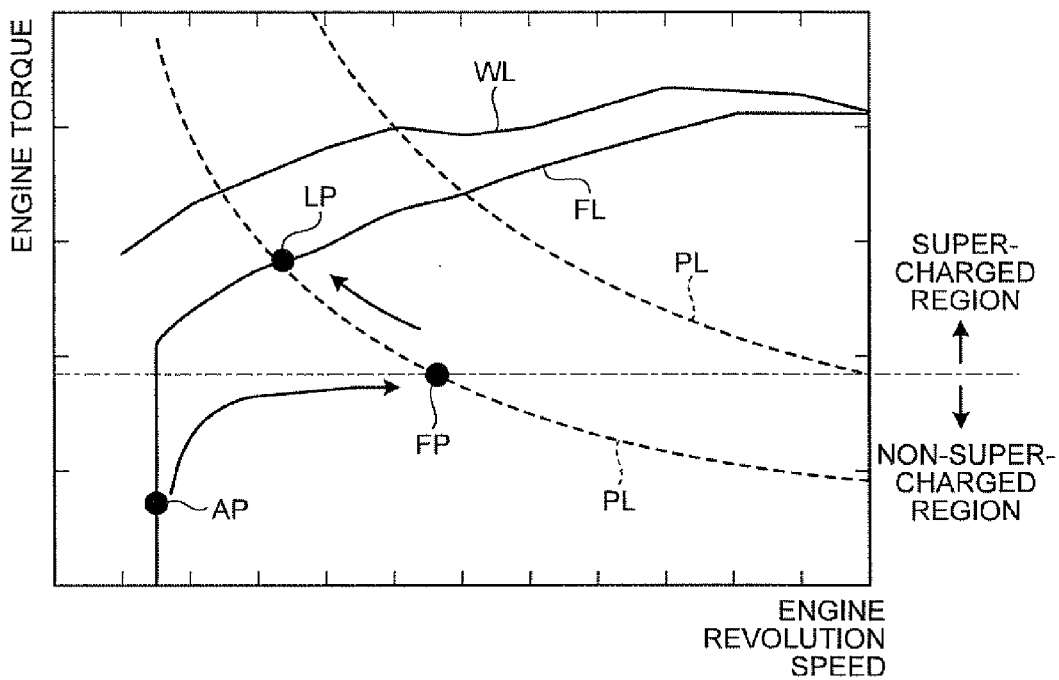
FIG. 3 is a view illustrating a method for controlling the revolution speed and torque of an engine when a vehicle is running.

FIG. 3 is a view illustrating a method for controlling the revolution speed and torque of the engine when the vehicle is running. When the vehicle is running, the engine 5 and the continuously variable transmission 35 are controlled according to the position of the accelerator pedal 60. Thereby, the vehicle runs in the operational status that a driver requests. However, at that time, the engine control unit 80 exerts control such that the operating point, which is a combination of the revolution speed and torque of the engine 5, is located, as much as possible, on the optimal fuel consumption line FL that refers to the line obtained by continuously connecting combinations of revolution speed and torque of the engine 5 for optimal fuel consumption.

That is, in order to perform operation control for the engine 5, the engine control unit 80 computes a required driving force from the accelerator opening degree captured by the accelerator opening degree capturing unit 72, and the vehicle speed captured by the vehicle speed capturing unit 75. From the required driving force thus computed, the required power, which is the power required for the engine 5, is computed. The power of the engine 5 is determined by the revolution speed and torque of the engine 5. However, since power is determined by a combination of revolution speed and torque of the engine 5 in such a manner, there are many combinations of revolution speed and torque equally capable of yielding the required power. For this reason, the engine control unit 80 exerts control such that an operating point is located near the intersection of the optimal fuel consumption line FL and the power contour line PL that refers to the line obtained by continuously connecting combinations of the revolution speed and torque of the engine 5 that are equally capable of yielding the required power. That is, the engine control unit 80 locates the final target operating point LP, which is the operating point for the final target, near the intersection of the optimal fuel consumption line FL and the power contour line PL, from which power equal to the required power may be obtained. Thereby, an actual operating point AP, or an actual operational point, approaches the final target operating point LP.

At this time, the torque of the engine 5 can be controlled by adjusting, for example, the degree of opening of the throttle valve 21, the amount of fuel injected, or the timing of ignition, by use of the engine control unit 80. However, the revolution speed of the engine 5 is determined by the vehicle speed and corresponding transmission ratio from the engine output shaft 6 to the driving wheels 57. Therefore, to exert control so that the actual operating point AP is located near the intersection of the power contour line PL and optimal fuel consumption line FL, the transmission ratio for the continuously variable transmission 35 has to be controlled as well. Specifically, based on the vehicle speed captured by the vehicle speed capturing unit 75, the transmission ratio for the continuously variable transmission 35 is altered by the transmission control unit 81 so that the revolution speed of the engine is equal to the revolution speed near the intersection of the power contour line PL and optimal fuel consumption line FL. Control by the engine control unit 80 and the transmission control unit 81 makes it possible to obtain a required driving force with appropriate fuel consumption. That is, both the engine control unit 80 and the transmission control unit 81 are provided as power control means capable of controlling the power of the engine 5.

Incidentally, the optimal fuel consumption line FL and power contour line PL are preset in the form of a map and stored in the storage unit 88 of the ECU 70. A plurality of power contour lines PL are set and stored in this map. In addition, WOT (Wide Open Throttle) torque WL indicating a torque when the accelerator pedal 60 is in full position is also stored in the map. The power of the engine 5 is obtained by multiplying the torque and revolution speed of the engine 5 together and further multiplying the value of this result and a coefficient. Therefore, the power contour line PL indicating the revolution speed and torque of the engine 5 that can generate the required power is generally such that, as the revolution speed of the engine 5 increases, the torque decreases, and the revolution speed decreases as the torque of the engine 5 increases.

When a vehicle runs, a required driving force is actualized by controlling the torque and revolution speed of the engine 5 in such a manner. However, since the engine 5 is provided with the turbocharger 15, the operating region of the engine 5 includes a supercharging region where supercharging is carried out by the turbocharger 15 and a non-supercharging region where supercharging is not carried out by the turbocharger 15. The supercharging region is the region where engine torque is large whereas the non-supercharging region is the region where engine torque is small compared to that in the supercharging region. That is, when the turbocharger 15 is actuated and supercharging is carried out, engine torque increases; therefore, the supercharging region is larger in engine torque than the non-supercharging region. Thus, the supercharging and non-supercharging regions differ in magnitude of engine torque. Hence, when the actual operating point AP is located within the supercharging region while the vehicle is accelerating, the speed of change with engine torque increase is high. Accordingly, the actual operating point AP reaches the final target operating point LP in a relatively short time.

Compared to this, when the actual operating point AP is located in a non-supercharging region while the vehicle is accelerating, the speed of change with engine torque increases is slow compared to the case where the actual operating point AP is located within the supercharging region. Therefore, if the vehicle accelerates while the actual operating point AP is located within the supercharging region, the time for the actual operating point AP to reach the final target operating point LP tends to increase, resulting in acceleration delay. To overcome this, the power control device 1 according to the first embodiment increases the revolution speed of the engine within the non-supercharging region if the actual operating point AP is located within the non-supercharging region when the vehicle accelerates. Thereby, the actual operating point AP is temporarily shifted to the operating point at which the required power for the engine 5 is obtained without taking fuel consumption into account.

Specifically, the actual operating point AP is brought nearer the point at which the point AP is located within the non-supercharging region of the power contour line PL, which represents the operational status in which the power equals the power corresponding to the final target operating point LP, and at which the engine torque is largest. Thereafter, the actual operating point AP is shifted to the final target operating point LP along this power contour line PL. That is, the engine revolution speed changes according to vehicle speed and the gear change ratio of the continuously variable transmission 35; therefore, where the engine revolution speed is modified by alteration of the transmission ratio of the continuously variable transmission 35, speed changes promptly regardless of whether the operating region is in the supercharging region or non-supercharging region. For this reason, to accelerate the vehicle while the actual operating point AP is located within the non-supercharging region, the engine revolution speed is increased to shift the actual operating point AP to the high rotation side within the non-supercharging region, thereby temporarily increasing the power of the engine 5 promptly.

Specifically, to accelerate the vehicle while the actual operating point AP is located within the non-supercharging region, control for shifting the actual operating point AP to the final target operating point LP is not exerted directly. Instead, the point at which the engine torque on the power contour line PL of the final target operating point LP located within the non-supercharging region is highest is used as an initial target operating point FP, and the actual operating point AP is shifted to this initial target operating point FP. When the actual operating point AP has shifted to the initial target operating point FP and then entered the supercharging region, the torque is increased while the increased engine revolution speed is decreased. Thereby, the actual operating point AP is shifted to the final target operating point LP. In other words, when the actual operating point AP has shifted to the initial target operating point FP, the turbocharger 15 is actuated and supercharging is carried out, resulting in an increase in power of the engine 5. Therefore, while the power of the engine 5 is increased, the actual operating point AP is shifted to the final target operating point LP. Thus, the actual operating point AP is promptly shifted to the final target operating point LP.

Figure 4:
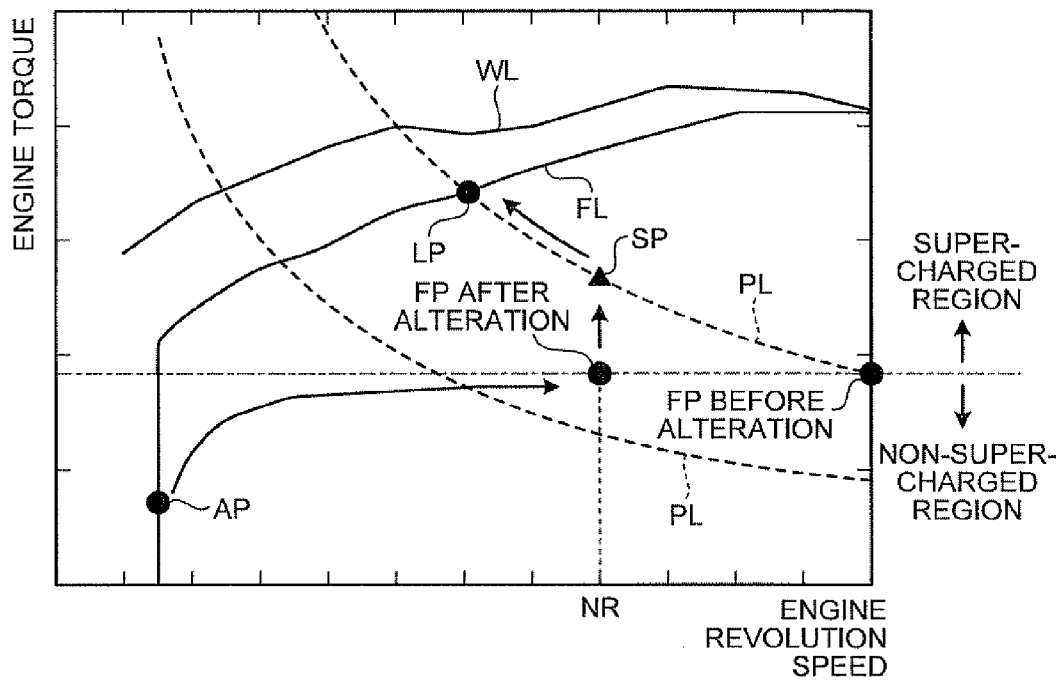
FIG. 4 is a view illustrating a method for controlling the revolution speed and torque of an engine taking into account noise emitted from the engine.

FIG. 4 is a view illustrating a method for controlling the revolution speed and torque of an engine taking into account noise emitted from the engine. If the vehicle is accelerated when the actual operating point AP is located within the non-supercharging region, the revolution speed is increased temporarily in the non-supercharging region, as described above. However, as the engine 5 increases the revolution speed, noise, such as sound generated from the engine 5 itself together with exhaust sound, increases. To overcome this, in the power control device 1 according to the first embodiment, a permissible-noise revolution speed NR, which is the upper limit of the revolution speed, to which noise that may increase with engine revolution speed increase is permissible, has been preset. To increase the engine revolution speed in the non-supercharging region, the revolution speed is set to this permissible-noise revolution speed NR or below.

Specifically, if the revolution speed at the initial target operating point FP is equal to or higher than the permissible-noise revolution speed NR, the initial target operating point FP is altered by resetting so that the initial target operating point FP is equal to or lower than the permissible-noise revolution speed NR. In this case, the altered initial target operating point FP may not be located on the power contour line PL of the final target operating point LP. After the initial target operating point FP is altered in such a manner, control is exerted such that the actual operating point AP is shifted to the initial target operating point FP. When the actual operating point AP has reached the altered initial target operating point FP, the actual operating point AP is shifted onto the power contour line PL of the final target operating point LP while the engine is maintained at the revolution speed at the initial target operating point FP.

That is, the point at which the engine revolution speed at the altered initial target operating point FP is obtained on the power contour line PL of the final target operating point LP is used as a second target operating point SP. After the actual operating point AP has been caused to reach the initial target operating point FP, this actual operating point AP is shifted to the second target operating point SP. After the actual operating point AP has reached the second target operating point SP, this actual operating point AP is shifted to the final target operating point LP.

Figure 5:
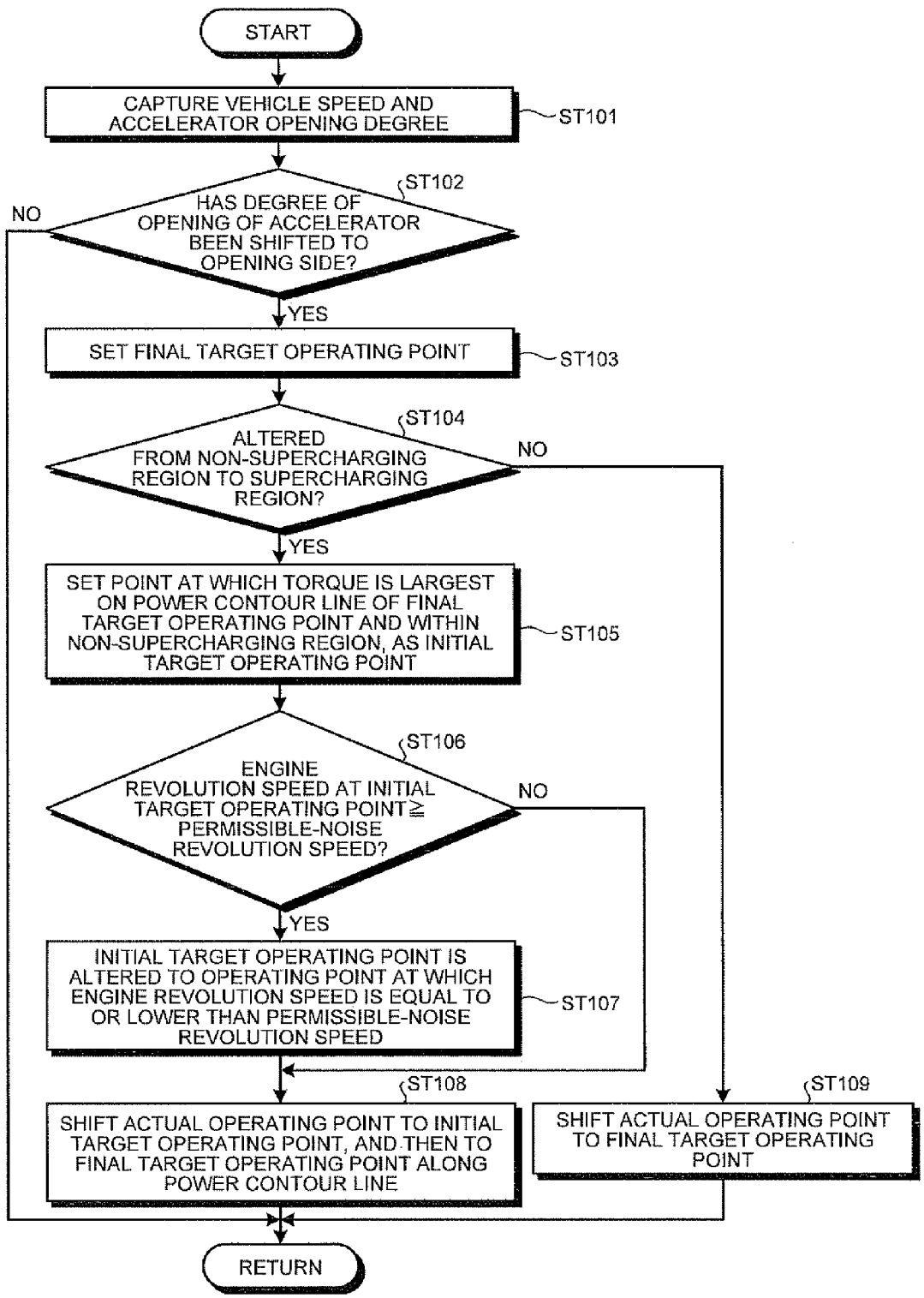
FIG. 5 is a flowchart illustrating the processing procedure in the power control device according to the first embodiment.

FIG. 5 is a flowchart illustrating the processing procedure in the power control device according to the first embodiment. Next, a method for controlling the power control device 1 according to the first embodiment, that is, the processing procedure in the power control device 1, will be described. When each unit is controlled during the running of the vehicle, the process below is called every predetermined period and performed. In the processing procedure in the power control device 1 according to the first embodiment, a vehicle speed and an accelerator opening degree are first captured (step ST101). For the vehicle speed, the revolution speed of the continuously variable transmission output shaft 37 is detected by the continuously variable transmission output shaft revolution speed sensor 46, and the result of the detection is captured by the vehicle speed capturing unit 75 of the processing unit 71 of the ECU 70. For the accelerator opening degree, the degree of opening of the accelerator pedal 60 is detected by the accelerator opening degree sensor 61, and the result of the detection is captured by the accelerator opening degree capturing unit 72 of the processing unit 71 of the ECU 70.

Subsequently, a determination is made whether the accelerator opening degree has shifted further toward the opening side than previously (step ST102). This determination is performed by the accelerator opening degree determining unit 77 of the processing unit 71 of the ECU 70. The accelerator opening degree determining unit 77 determines whether the accelerator opening degree has shifted further to the opening side than previously, by comparing the accelerator opening degree captured by the accelerator opening degree capturing unit 72 in the current processing procedure with that captured by the same accelerator opening degree capturing unit 72 in the previous processing procedure. That is, if the accelerator opening degree captured in the current processing procedure is greater than that captured in the previous processing procedure, the accelerator opening degree determining unit 77 determines that the accelerator opening degree has shifted further to the opening side than in the previous processing procedure. If the accelerator opening degree determining unit 77 determines that the accelerator opening degree has not shifted further to the opening side than previously, the flow of processing departs from this procedure.

If the accelerator opening degree determining unit 77 determines that the accelerator opening degree has shifted further to the opening side than previously (step ST102), the final target operating point LP is set (step ST103). This is set by the engine control unit 80 of the processing unit 71 of the ECU 70. The engine control unit 80 calculates the required driving force from the vehicle speed captured by the vehicle speed capturing unit 75 and the accelerator opening degree captured by the accelerator opening degree capturing unit 72, and then calculates the power required for the engine 5 from the calculated required driving force. The engine control unit 80 sets the final target operating point LP by using the required power thus calculated and the map (see FIG. 3) of the optimal fuel consumption line FL and power contour line PL stored in the storage unit 88 of the ECU 70. That is, the intersection of the optimal fuel consumption line FL and the power contour line PL indicating the revolution speed and torque capable of realizing power equal to the power required is set as the final target operating point LP. This final target operating point LP is the final one of the target operating points for acceleration.

Subsequently, a determination is made whether the operation region of the engine 5 is changed from the non-supercharging region to the supercharging region (step ST104). This determination is carried out by the operation region determining unit 78 of the processing unit 71 of the ECU 70. If the present operating point, that is, the actual operating point AP, which is the operating point indicating the combination of revolution speed and torque of the actual engine 5, is located within the non-supercharging region and if the final target operating point LP set by the engine control unit 80 is located within the supercharging region, the operation region determining unit 78 determines that the operation region of the engine 5 is changed from the non-supercharging region to the supercharging region. If the operation region determining unit 78 determines that the operation region of the engine 5 is not changed from the non-supercharging region to the supercharge region, the control shifts to step ST109, which is described below. That is, for example, if, both the actual operating point AP and final target operating point LP are located in the supercharging region or non-supercharging region, the flow proceeds to step ST109, which is described below.

If a determination is made by the operation region determining unit 78 that the operation region of the engine 5 is changed from the non-supercharging region to the supercharging region (step ST104), the point at which the torque is largest on the power contour line PL of the final target operating point LP and within the non-supercharging region is used as the initial target operating point FP (step ST105). This is set by the engine control unit 80 in the same manner as the setting for the final target operating point LP. The engine control unit 80 sets, as the initial target operating point FP, the point at which torque is largest within the non-supercharging region on the power contour line PL indicating the revolution speed and torque of the engine 5, at which power equal to the final target operating point LP is obtained. That is, the engine control unit 80 sets, as the initial target operating point FP, the point where this power contour line PL and the boundary between the non-supercharging and supercharging regions intersect.

Subsequently, a determination is made whether the engine revolution speed at the initial target operating point FP is equal to or higher than the permissible-noise revolution speed or not (step ST106). This is determined by the engine revolution speed determining unit 79 of the processing unit 71 of the ECU 70. The permissible-noise revolution speed NR used in this determination is preset as the upper limit permissible of engine revolution speed noise that may increase with an engine revolution speed increase, and is stored in the storage unit 88 of the ECU 70. The engine revolution speed determining unit 79 compares this permissible-noise revolution speed NR and the engine revolution speed at the initial target operating point FP set by the engine control unit 80, and determines whether the engine revolution speed at the initial target operating point FP is equal or higher than the permissible-noise revolution speed NR. If the engine revolution speed determining unit 79 determines that the engine revolution speed at the initial target operating point FP is not equal to or higher than the permissible-noise revolution speed NP, that is, the engine revolution speed at the initial target operating point FP is lower than the permissible-noise revolution speed NR, the control flows to step ST108, which is described below.

If the engine revolution speed determining unit 79 determines that the engine revolution speed at the initial target operating point FP is equal to or higher than the permissible-noise revolution speed (Step ST106), the initial target operating point FP is then altered to the operating point at which the engine revolution speed is equal to or lower than the permissible-noise revolution speed NR (step ST107). This alternation is carried out by the engine control unit 80. Specifically, the engine control unit 80 alters the initial target operating point FP to the point where the engine revolution speed equal to or lower than the permissible-noise revolution speed NR intersects the boundary between the non-supercharging and supercharging regions (refer to FIG. 4). It is preferable that the engine revolution speed where the initial target operating point FP alters in such a manner to be equal to or lower than but nevertheless near the permissible-noise revolution speed NR.

Additionally, when the engine revolution speed at the initial target operating point FP is equal to or higher than the permissible-noise revolution speed, the engine control unit 80 alters the initial target operating point and the second target operating point SP is set simultaneously. The point at which the engine revolution speed at the initial target operating point FP is altered on the power contour line PL of the final target operating point LP is set as the second target operating point SP.

Subsequently, the actual operating point AP is shifted to the initial target operating point FP, and then shifted to the final target operating point LP along the power contour line PL (step ST108). Control of this actual operating point AP is exerted by the engine control unit 80 and the transmission control unit 81. Specifically, if the initial target operating point FP is altered in step ST107, the engine control unit 80 controls the engine 5 such that the degree of opening of the throttle valve 21 is increased, thereby increasing the engine torque. Simultaneously, the transmission control unit 81 controls the continuously variable transmission 35 such that the transmission ratio of the continuously variable transmission 35 is increased to a low-speed side, thereby increasing the engine revolution speed. Thus, the actual operating point AP is shifted to the altered initial target operating point FP.

When the actual operating point AP has reached the initial target operating point FP, the turbocharger 15 is capable of performing supercharging, facilitating increase of engine torque. Therefore, when the actual operating point AP has reached the initial target operating point FP, the engine torque is further increased and, at the same time, the transmission ratio of the continuously variable transmission 35 is gradually decreased and hence altered to a slightly high-speed side. Thus, while the engine revolution speed is maintained at the revolution speed at the initial target operating point FP, the actual operating point AP is shifted to the second target operating point SP.

When the actual operating point AP is shifted to the second target operating point SP, the engine torque is increased and, at the same time, the transmission ratio of the continuously variable transmission 35 is decreased and hence altered to a high-speed side. Where the transmission ratio is altered to a high-speed side in such a case, the engine revolution speed decreases. Therefore, both the engine 5 and the continuously variable transmission 35 are controlled such that while the engine torque is increased, the engine revolution speed is decreased, thereby shifting the actual operating point AP to the final target operating point LP along the power contour line PL.

If the engine revolution speed determining unit 79 determines that the engine revolution speed at the initial target operating point FP is not equal to or higher than the permissible-noise revolution speed (step ST106) after the engine control unit 80 has set the initial target operating point FP (step ST105), the actual operating point AP is first shifted to the initial target operating point FP by increasing the engine revolution speed while increasing the engine torque. In this case, the initial target operating point FP is located on the power contour line PL of the final target operating point LP. Therefore, the actual operating point AP is shifted to the final target operating point LP along the power contour line PL by decreasing the engine revolution speed while carrying out supercharging by means of the turbocharger 15 and increasing the engine torque as it is. As a result, the actual revolution speed and torque of the engine 5 reach the revolution speed and torque set for the engine 5 at the final target operating point LP. Accordingly, the engine 5 operates with required power while satisfactorily maintaining fuel consumption.

Moreover, when the operation region determining unit 78 determines for them that the operation region of the engine 5 has not changed from the non-supercharging region to the supercharging region (step ST104), the actual operating point AP is shifted to the final target operating point LP (step ST109). Control of this actual operating point AP is exerted by the engine control unit 80 and the transmission control unit 81 in the same manner as where the initial target operating point FP is set. That is, the engine control unit 80 controls the engine 5 such that the engine torque equals the torque at the final target operating point LP, and also the transmission control unit 81 controls the continuously variable transmission 35 such that the engine revolution speed equals the revolution speed at the final target operating point LP. Thereby, the actual operating point AP shifts to the final target operating point LP and, hence, the actual revolution speed and torque of the engine 5 reach the revolution speed and torque of the engine 5 at the final target operating point LP. Accordingly, the engine 5 operates generating required power while maintaining satisfactory fuel consumption.

In the foregoing power control device 1, if the actual operating point AP is located in the non-supercharging region and the final target operating point LP is located in the supercharging region when the vehicle is accelerating, the engine control unit 80 and the transmission control unit 81 control the engine 5 and the continuously variable transmission 35, respectively, thereby increasing the engine revolution speed until the actual operating point AP shifts to the supercharging region. Thus, even in the state where the engine torque cannot be increased promptly because the actual operating point AP is located in the non-supercharging region, the power of the engine 5 can be increased promptly by increasing the engine revolution speed. Moreover, after the actual operating point AP enters the supercharging region, the turbocharger 15 performs supercharging, thereby increasing the engine torque. Therefore, the actual operating point AP is shifted to the final target operating point LP while the engine revolution speed is decreased. This final target operating point LP is the intersection of power contour line PL of the target power of the engine 5 and the optimal fuel consumption line FL. Accordingly, when the final target operating point LP reaches the actual operating point AP, the engine 5 that operates with the revolution speed and torque at the actual operating point AP can obtain power sufficient to actualize the driving force required by a driver. Also, the engine 5 can be operated with satisfactory fuel consumption. This makes it possible not only to secure driving force but also suppress degradation in fuel consumption when accelerating a vehicle that has, as a power source, the engine 5 with the turbocharger 15.

Moreover, when the actual operating point AP is shifted while accelerating the vehicle, the transmission control unit 81 controls the engine revolution speed through control of the transmission ratio of the continuously variable transmission 35 while the engine control unit 80 controls the power of the engine 5. Accordingly, both the required torque and revolution speed can be obtained for the engine 5, and a more desirably reliable state can also be obtained at the actual operating point AP. As a result, both ensured driving force and suppressed degradation in fuel consumption can be achieved more reliably when accelerating a vehicle that uses, as a power source, the engine 5 with the turbocharger 15.

Moreover, the point at which the power contour-line PL of the final target operating point LP intersects the boundary between the non-supercharging and supercharging regions is set as the initial target operating point FP, and the engine revolution speed is first increased at the time of acceleration of the vehicle, thereby shifting the actual operating point AP to the initial target operating point FP. Accordingly, even when supercharging by the turbocharger 15 does not occur, the engine 5 can generate the required power promptly and more reliably. Thereby, even when the actual operating point AP is located in the non-supercharging region at the time of acceleration of the vehicle, the driving force required can be realized promptly and more reliably. Moreover, as the engine torque increases due to a rise thereafter in supercharged pressure, the engine revolution speed is decreased, thereby shifting the actual operating point AP to the final target operating point LP. This makes it possible to obtain an operational status in which fuel consumption is satisfactory while power and driving force are maintained at required levels. As a result, both ensured driving force and suppressed degradation in fuel consumption can be achieved more reliably when accelerating a vehicle that uses, as a power source, the engine 5 with the turbocharger 15.

Moreover, if the engine revolution speed is equal to or higher than the permissible-noise revolution speed NR when it is increased in order to shift the actual operating point AP to the initial target operating point FP located in the non-supercharging region at the time of acceleration of the vehicle, the initial target operating point FP is altered to the operating point at which the engine revolution speed is equal to or lower than the permissible-noise revolution speed NR. Thereby, noise can be suppressed when the engine revolution speed is increased in order to increase the power of the engine 5 promptly when the actual operating point AP is located in the non-supercharging region at the time of acceleration of the vehicle. Moreover, in this case, the point at which the engine revolution speed at the altered initial target operating point FP on the power contour-line PL of the final target operating point LP is located is set as the second target operating point SP. When the actual operating point AP has reached the initial target operating point FP, the actual operating point AP is shifted to the second target operating point SP by increasing torque while maintaining engine revolution speed. Furthermore, when the actual operating point AP has reached the second target operating point SP, the actual operating point AP is shifted to the final target operating point LP by decreasing engine revolution speed while increasing engine torque. By virtue of these, power and driving force are maintained at required levels while noise is suppressed. As a result, both ensured driving force and suppressed degradation in fuel consumption can be achieved more reliably when accelerating a vehicle that uses, as a power source, the engine 5 with the turbocharger 15.

Second Embodiment

Figure 6:
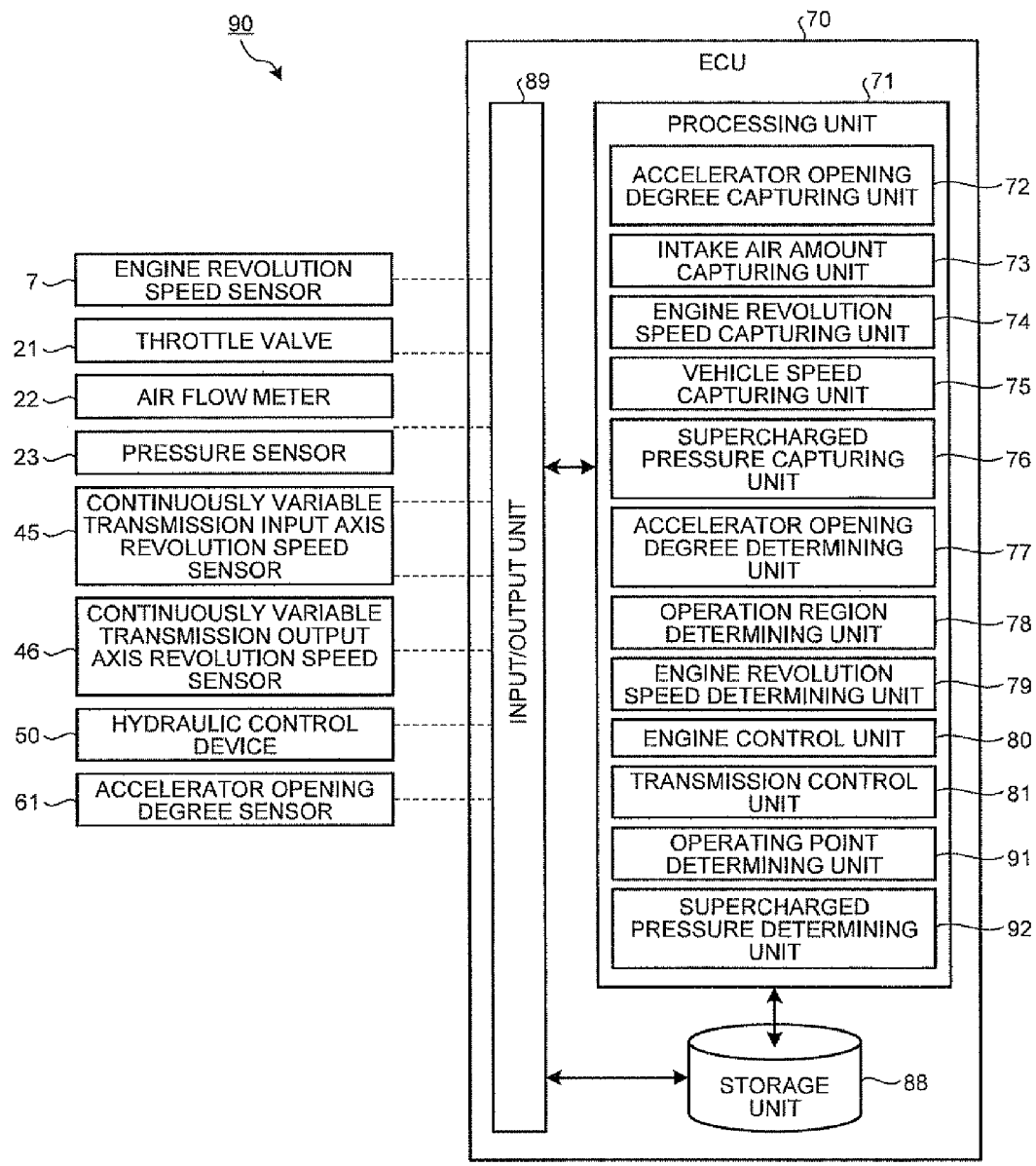
FIG. 6 is a view illustrating the main part of the power control device according to a second embodiment.

A power control device 90 according to a second embodiment is substantially identical in configuration to the power control device 1 according to the first embodiment. However, the power control device 90 is distinguished in the following respect: when supercharged pressure required to generate torque at the final target operating point LP is obtained in the course of shifting the actual operating point AP to the initial target operating point FP, the actual operating point AP is shifted to the final target operating point LP by increasing engine torque without shifting the actual operating point AP to the initial target operating point FP. Otherwise, the configuration of the power control device 90 in the second embodiment is identical to that in the first embodiment, and explanations thereof are omitted and identical labels indicate identical components. FIG. 6 is a view illustrating the main part of the power control device according to the second embodiment. Like the power control device 1 according to the first embodiment, the power control device 90 according to the second embodiment is capable of controlling the power of an engine 5 provided with a turbocharger 15. The power control device 90 controls the power of the engine 5 by controlling the engine 5 and an automatic transmission 30.

The power control device 90 according to the second embodiment exerts control such that when an actual operating point AP is shifted to a final target operating point LP, the state of supercharged pressure relating to the magnitude of the engine torque is included in a determination reference for control. For this reason, in the power control device 90 according to the second embodiment, the processing unit 71 of an ECU 70 includes an accelerator opening degree capturing unit 72, the intake air amount capturing unit 73, the engine revolution speed capturing unit 74, the vehicle speed capturing unit 75, the supercharged pressure capturing unit 76, the accelerator opening degree determining unit 77, the operation region determining unit 78, the engine revolution speed determining unit 79, the engine control unit 80 and the transmission control unit 81. In addition to these, the power control device 90 includes: an operating point determining unit 91, serving as an operating point determining means, which determines the status at the actual operating point AP; and a supercharged pressure determining unit 92, serving as a supercharged pressure determining means, which determines the relation between the supercharged pressure captured by the supercharged pressure capturing unit 76 and a predetermined threshold value.

The power control device 90 according to the second embodiment has the foregoing configuration, and the operation thereof will now be described. The power control device 90 according to the second embodiment detects a supercharged pressure when shifting the actual operating point AP to the initial target operating point FP. If the supercharged pressure detected is equal to or higher than the supercharged pressure required to generate engine torque at the final target operating point LP, the actual operating point AP is shift to the final target operating point LP by increasing engine torque without shifting the actual operating point AP to the initial target operating point FP.

Figure 7:
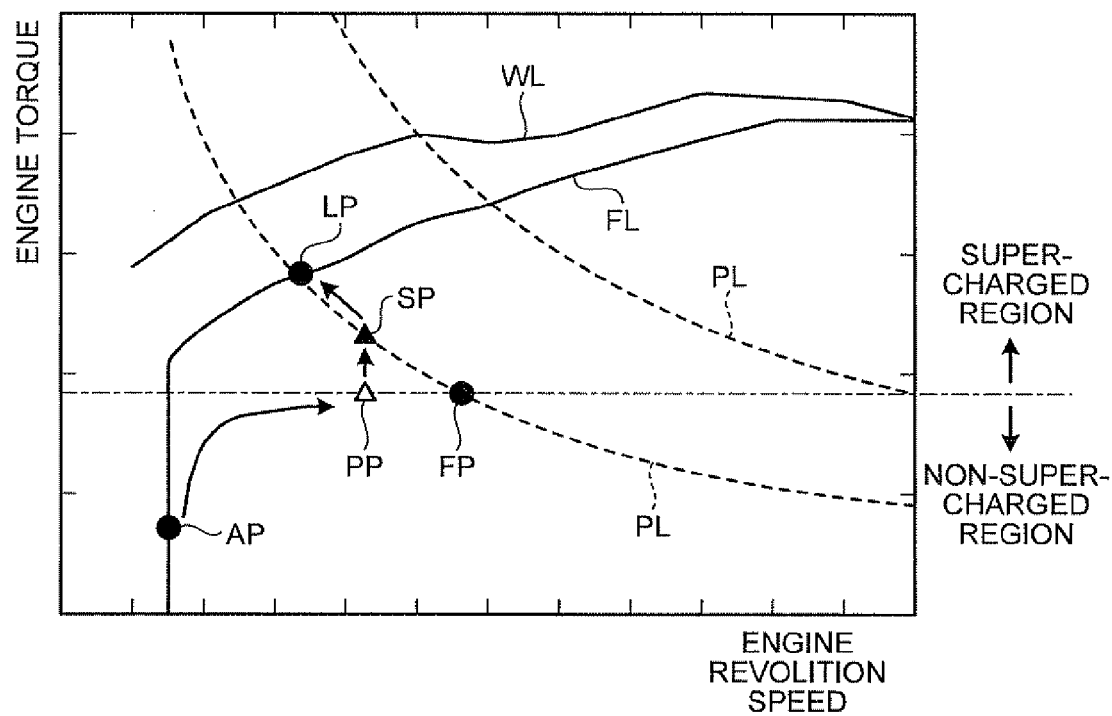
FIG. 7 is a view illustrating a method for controlling engine revolution speed and torque taking supercharged pressure into account.

FIG. 7 is a view illustrating a method for controlling engine revolution speed and torque taking supercharged pressure into account. If a vehicle accelerates when the actual operating point AP is located in a non-supercharging region, the engine revolution speed is at temporarily increased in a non-supercharging region, as in the power control device 1 according to the first embodiment. However, when the engine revolution speed increases, the supercharged pressure is liable to increase. The final target operating point LP is an operating point in the supercharging region of the operation region of the engine 5. Therefore, when supercharged pressure increases as described above, and reaches a supercharged pressure capable of realizing the engine torque at the final target operating point LP, the actual operating point AP can be shifted to the final target operating point LP. For this reason, the power control device 90 according to the second embodiment detects supercharged pressure in the course of shifting the actual operating point AP to the initial target operating point FP. If the detected supercharged pressure is equal to or higher than the supercharged pressure required to generate engine torque at the final target operating point LP, engine torque is increased even when the actual operating point AP has not reached the initial target operating point FP. Then, the actual operating point AP is shifted to the power contour line PL of final target operating point LP.

Specifically, supercharged pressure in the course of shifting the actual operating point AP to the initial target operating point FP is detected by a pressure sensor 23 disposed in the intake passage 11 of the engine 5. If the detected supercharged pressure is equal to or higher than that required to generate engine torque at the final target operating point LP and the actual operating point AP has not reached the initial target operating point FP, torque is increased without increasing revolution speed of the engine 5 from this time. That is, if current supercharged pressure is equal to or higher than required supercharged pressure and the actual operating point AP has not reached the initial target operating point FP, the actual operating point AP at this time is set as a supercharged pressure attainment operating point PP. Furthermore, the point at which the engine revolution speed at the supercharged pressure attainment operating point PP is obtained on the power contour line PL of the final target operating point LP is set as a second target operating point SP. Then, the actual operating point AP is shifted from the supercharged pressure attainment operating point PP to the second target operating point SP by increasing torque without increasing revolution speed of the engine 5. When the actual operating point AP has reached the second target operating point SP, the actual operating point AP is then shifted to the final target operating point LP.

Figure 8:
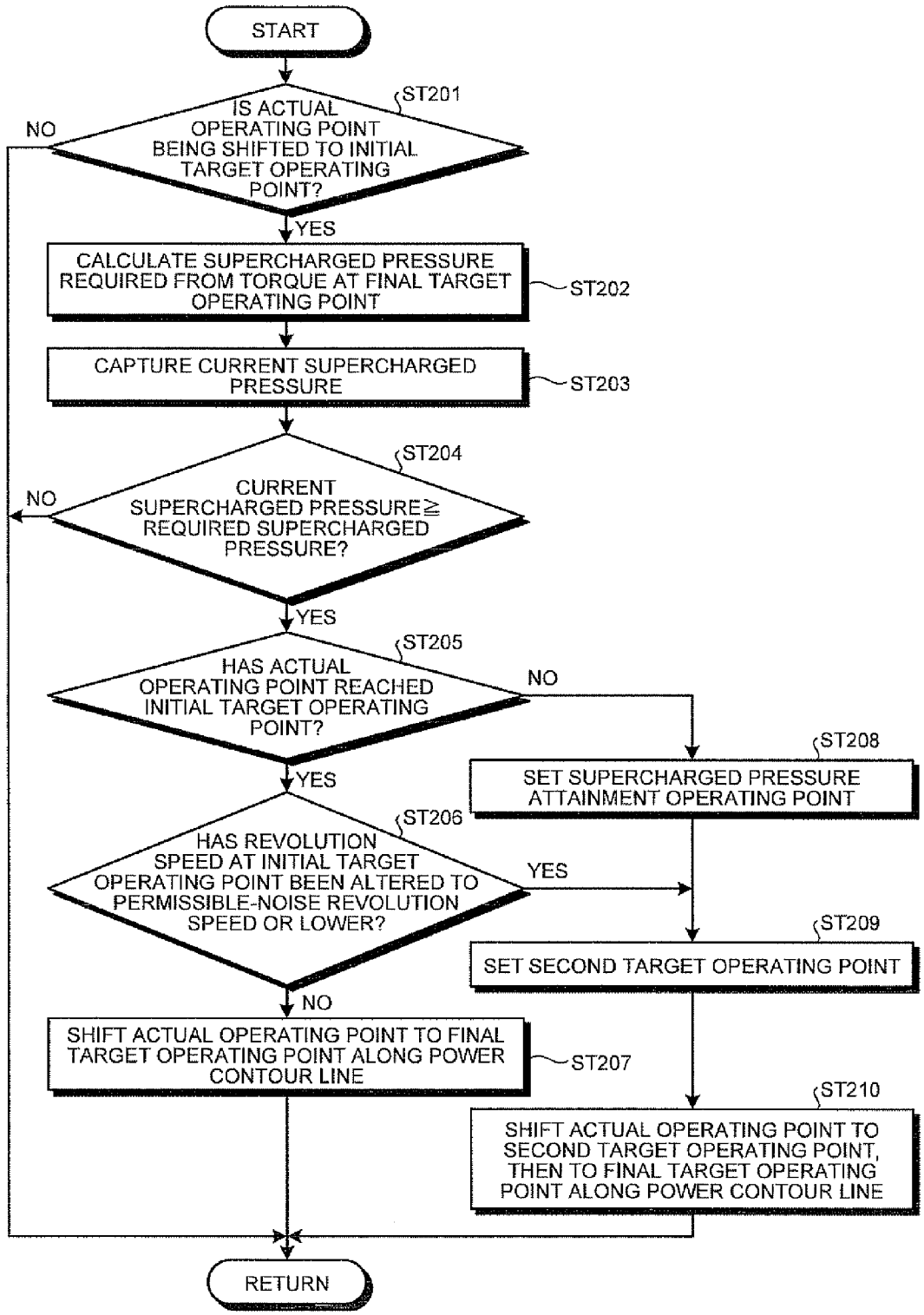
FIG. 8 is a flowchart illustrating the processing procedure in the power control device according to the second embodiment.

FIG. 8 is a flowchart illustrating the processing procedure in the power control device according to the second embodiment. Next, a method for controlling the power control device 90 according to the second embodiment, that is, the processing procedure in the power control device 90, will be described. When each unit is controlled during the running of the vehicle, the process below is called every predetermined period and performed. Below is the description of the processing procedure after the final target operating point LP and the initial target operating point FP have been set by the same method as in the power control device 1 according to the first embodiment.

In the processing procedure of the power control device 90 according to the second embodiment, a determination is made whether the actual operating point AP is being shifted to the initial target operating point FP after the final target operating point LP and initial target operating point FP have been set (step ST201). This determination is made by the operating point determining unit 91 of the processing unit 71 of the ECU 70. The actual operating point AP is a combination of the revolution speed and torque of the engine 5. Therefore, the operating point determining unit 91 captures: the revolution speed of the engine 5 captured by the engine revolution speed capturing unit 74, and, from the amount of intake air captured by the intake air amount capturing unit 73 and from the amount of injected fuel controlled by the engine control unit 80, the torque of the engine 5. The operating point determining unit 91 determines whether the actual operating point AP is being shifted to the initial target operating point FP based on the degree of change in the thus obtained revolution speed and torque of the engine 5. If the operating point determining unit 91 determines that the actual operating point AP is not being shifted to the initial target operating point FP, the flow of processing departs from this procedure.

If the operating point determining unit 91 determines that the actual operating point AP is being shifted to the initial target operating point FP (step ST201), the supercharged pressure required is calculated from the torque at the final target operating point LP (step ST202). This calculation is performed by the engine control unit 80. Using a map, stored in the storage unit 88 of the ECU 70, indicating relations among supercharged pressure, torque, and revolution speed, the engine control unit 80 calculates the supercharged pressure required for the engine torque at the final target operating point LP to be generated at the engine revolution speed at the final target operating point LP set by the engine control unit 80 (refer to step ST103 in first embodiment). This required supercharged pressure may be calculated using, for example, a function indicating relations among supercharged pressure, torque, and revolution speed.

Next, the current supercharged pressure is captured (step ST203). The current supercharged pressure level is captured by the supercharged pressure capturing unit 76 of the processing unit 71 of the ECU 70. The supercharged pressure capturing unit 76 captures the supercharged pressure, which is pressure downstream of the compressor 16 of the turbocharger 15 in the intake passage 11, from the result detected by the pressure sensor 23. This captured supercharged pressure level is determined as the current supercharged pressure applied when the actual operating point AP is being shifted to the initial target operating point FP.

Next, a determination is made whether current supercharged pressure is equal to or higher than required supercharged pressure (step ST204). This determination is performed by the supercharged pressure determining unit 92 of the processing unit 71 of the ECU 70. The supercharged pressure determining unit 92 compares the current supercharged pressure captured by the supercharged pressure capturing unit 76 with the required supercharged pressure calculated by the engine control unit 80, and determines whether the present supercharged pressure is equal to or higher than the required supercharged pressure. If the supercharged pressure determining unit 92 determines that the present supercharged pressure is not equal to or higher than the required supercharged pressure, that is, if a determination is made that the present supercharged pressure is lower than the required supercharged pressure, the flow of processing departs from this procedure.

If the supercharged pressure determining unit 92 determines that current supercharged pressure is equal to or higher than the required supercharged pressure (step ST204), a determination is next made whether the actual operating point AP has reached the initial target operating point FP (step ST205). This determination is performed by the operating point determining unit 91. The operating point determining unit 91 captures revolution speed and torque of the engine 5 at the actual operating point AP by capturing the current revolution speed and torque of the engine 5, as in the case where the determination is made whether the actual operating point AP is being shifted to the initial target operating point FP (step ST201). The operating point determining unit 91 compares the revolution speed and torque of the engine 5 at the actual operating point AP thus captured with those at the initial target operating point FP set by the engine control unit 80 (refer to step ST105 in the first embodiment). If the revolution speed and torque of the engine 5 at the actual target operating point AP are equal to those at the initial target operating point FP, then a determination is made that the actual operating point AP has reached the initial target operating point FP.

Where this determination is made, predetermined determination ranges used to determine whether revolution speed and torque are equal to corresponding ones have been set for the revolution speed and torque of the engine 5. In the comparison of the revolution speed and torque of the engine 5 at the actual operating position AP with those at the initial target operating position FP, if the respective differences are within the corresponding determination ranges, the revolution speeds and torques are determined to be equal. That is, if the difference between the revolution speeds of the engine 5 at the actual operating point AP and the initial target operating point FP and the difference between the torques of the engine 5 at the actual operating point AP and the initial target operating point FP are within the corresponding determination ranges, a determination is made that the actual operating point AP has reached the initial target operating point FP.

If the operating point determining unit 91 determines that the actual operating point AP has reached the initial target operating point FP (step ST205), a determination is next made whether revolution speed at the initial target operating point FP has been altered to the permissible-noise revolution speed NR or lower (step ST206). This determination is performed by the engine revolution speed determining unit 79 of the processing unit 71 of the ECU 70. Specifically, if a determination is made that the engine revolution speed at the initial target operating point FP is equal to or higher than the permissible-noise revolution speed NR, the engine control unit 80 alters the engine revolution speed at the initial target operating point FP to a revolution speed equal to or lower than the permissible-noise revolution speed NR (refer to step ST107 in the first embodiment). However, the engine revolution speed determining unit 79 determines whether the engine revolution speed at the initial target operating point FP has been altered to the permissible-noise revolution speed NR or lower in such a manner.

In order that the engine revolution speed determining unit 79 determine whether the engine revolution speed at the initial target operating point FP has altered in this manner, the engine revolution speed at the initial target operating point FP at the time of setting this initial target operating point FP is stored. Then, the determination is made by comparing the stored engine revolution speed and that at the present initial target operating point FP. In addition, the determination of whether the revolution speed at this initial target operating point FP has been altered to the permissible-noise revolution speed NR or lower may be made by a method other than this determination method. For example, since the initial target operating point FP is located on the power contour line PL of the final target operating point LP at the time of setting this initial target operating point FP, the determination may be made by comparing the engine revolution speed at the present initial target operating point FP with the engine revolution speed corresponding to the engine torque at the present initial target operating point FP on the power contour line PL.

If the engine revolution speed determining unit 79 determines that the engine revolution speed at the initial target operating point FP has not been altered to the permissible-noise revolution speed NR or below (step ST206), the actual operating point AP is shifted to the final target operating point LP along the power contour line PL (step ST207). Control of this actual operating point AP is performed by the engine control unit 80 and the transmission control unit 81. Specifically, the engine 5 is controlled by the engine control unit 80 such that engine torque is increased by further increasing the degree of opening of the throttle valve 21. Simultaneously with this, the continuously variable transmission 35 is controlled by the transmission control unit 81 such that the transmission ratio of the continuously variable transmission 35 is decreased to a high-speed transmission ratio, thereby decreasing engine revolution speed. Thus, the actual operating point AP is shifted to the final target operating point LP along the power contour line PL. When the actual operating point AP has reached the final target operating point LP, the actual revolution speed and torque of the engine 5 are equal to the revolution speed and torque of the engine 5 at the final target operating point LP. Accordingly, the engine 5 operates generating required power while maintaining satisfactory fuel consumption.

Conversely, if the supercharged pressure determining unit 92 determines whether the current supercharged pressure is equal to or higher than the required supercharged pressure (step ST204) and the operating point determining unit 91 determines that the actual operating point AP has not reached the initial target operating point FP (step ST205), a supercharged pressure attainment operating point PP is set (step ST208). This setting is performed by the engine control unit 80. The engine control unit 80 sets, as the supercharged pressure attainment operating point PP, the actual operating point AP when the supercharged pressure has become equal to or higher than the required supercharged pressure.

Thus, when the supercharged pressure attainment operating point PP is thus set by the engine control unit 80, or when the engine revolution speed determining unit 79 determines that the revolution speed at the initial target operating point FP has been altered to the permissible-noise revolution speed NR or lower (step ST206), the second target operating point SP is set (step ST209). This setting is performed by the engine control unit 80. If the engine control unit 80 has set the supercharged pressure attainment operating point PP, this engine control unit 80 sets, as the second target operating point SP, the point at which the engine revolution speed at the supercharged pressure attainment operating point PP is obtained on the power contour line PL of the final target operating point LP. Moreover, if the revolution speed at the initial target operating point FP has been altered to the permissible-noise revolution speed NR or lower, the point at which the altered engine revolution speed at the initial target operating point FP is located on the power contour-line PL of the final target operating point LP is set as the second target operating point SP.

Next, after the actual operating point AP is shifted to the second target operating point SP, this point is shifted to the final target operating point LP along the power contour line PL (step ST210). Specifically, if the second target operating point SP has been set (step ST209), the engine 5 is controlled by the engine control unit 80 such that the engine torque is increased by increasing the degree of opening of the throttle valve 21. Simultaneously with this, the continuously variable transmission 35 is controlled by the transmission control unit 81 such that the gear-change ratio of the continuously variable transmission 35 is gradually decreased to a slightly high-speed side. Thereby, the actual operating point AP is shifted to the second target operating point SP while the engine revolution speed is maintained at the supercharged pressure attainment operating point PP or the initial target operating point FP.

After the actual operating point AP is shifted to the second target operating point SP, the engine revolution speed is decreased by decreasing the transmission ratio of the continuously variable transmission 35 to a high-speed side while the engine torque is increased. Thereby, the actual operating point AP is shifted to the final target operating point LP along the power contour line PL. When the actual operating point AP has reached the final target operating point LP, the actual revolution speed and torque of the engine 5 are equal to the revolution speed and torque of the engine 5 at the final target operating point LP. Accordingly, the engine 5 operates generating required power while maintaining satisfactory fuel consumption.

In the foregoing power control device 90, the engine revolution speed is increased in order to shift the actual operating point AP to the initial target operating point FP when the actual operating point AP is located in a non-supercharging region at the time of acceleration of the vehicle. If supercharged pressure becomes equal to or higher than the required supercharged pressure in this case, the actual operating point AP when current supercharged pressure becomes equal to or higher than the required supercharged pressure is set as the supercharged pressure attainment operating point PP. Furthermore, the point at which the engine revolution speed at the supercharged pressure attainment operating point PP is located on the power contour line PL of the final target operating point LP is set as the second target operating point SP. While maintaining engine revolution speed at the supercharged pressure attainment operating point PP thus set, the engine control unit 80 increases engine torque. Then, the engine control unit 80 first shifts the actual operating point AP to the second target operating point SP from the supercharged pressure attainment operating point PP, thereby shifting the actual operating point AP onto the power contour line PL of the final target operating point LP, then shifts this actual operating point AP to the final target operating point LP.

If the actual operating point AP is located in the non-supercharging region when the actual operating point AP is shifted to the final target operating point LP, the actual operating point AP is temporarily shifted to the initial target operating point FP. In this case, even if the actual operating point AP has not reached the initial target operating point FP, the actual operating point AP can be shifted onto the power contour line PL of the final target operating point LP in the supercharged region. Therefore, the engine 5 which operates with the revolution speed and torque at the actual operating point AP can obtain, at an early stage, power capable of actualizing a driving force required by a driver, and can be brought into an operational status with satisfactory fuel consumption. As a result, driving force for accelerating a vehicle that uses, as a power source, the engine 5 equipped with the turbocharger 15 can be obtained promptly while suppressing fuel consumption degradation.

Third Embodiment

Figure 9:
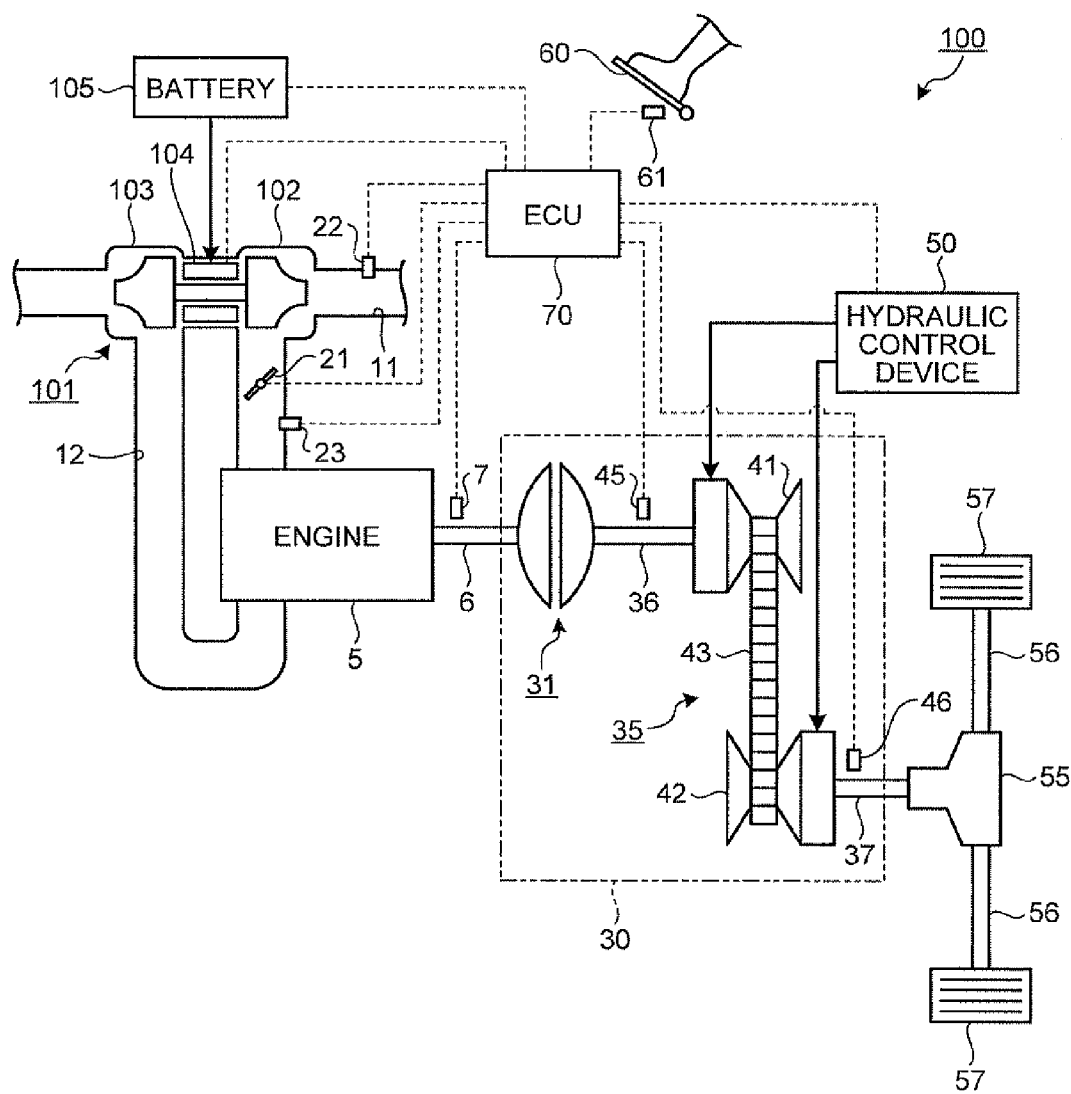
FIG. 9 is a view illustrating the main part of the power control device according to a third embodiment.

A power control device 100 according to the third embodiment is substantially identical in configuration to the power control device 1 according to the first embodiment. However, the power control device 100 is distinguished in the following respect: a turbocharger 101 is an electric turbocharger 101, operable by electricity. Otherwise, the configuration of the power control device 100 in the third embodiment is identical to that in the first embodiment, and explanations thereof are omitted and identical labels indicate identical components. FIG. 9 is a view illustrating the main part of the power control device according to the third embodiment. Like the power control device 1 according to the first embodiment, the power control device 100 according to the third embodiment is capable of controlling the power of an engine 5, and the power of the engine 5 is controlled by the engine 5 and the automatic transmission 30. Additionally, in the power control device 100 according to the third embodiment, the engine 5 is provided with a supercharger as in the power control device 1 according to the first embodiment. However, this supercharger can operate not only by means of exhaust gas expelled by the engine 5 but also electricity, and is a turbocharger 101 capable of electrical assistance. This turbocharger 101 includes a compressor 102 disposed in an intake passage 11, and a turbine 103 disposed in an exhaust passage 12. This turbocharger 101 further includes a turbo-motor 104, which is an electric motor capable of rotating the compressor 102 and the turbine 103 integrally by means of electricity.

In the turbocharger 101, the compressor 102 is actuated not only by the turbine 103 actuated by exhaust gas but also by the turbo-motor 104 actuated by electricity. Air flowing in the intake passage 11 can be compressed by operation of the compressor 102. The turbocharger 101 can be actuated by electricity supplied by a battery 105 mounted in a vehicle as a power source. In the power control device 100 according to the third embodiment, the turbocharger 101 is provided so as to be operable by means of electricity as well in such a manner. Therefore, to shift the actual operating point AP to the final target operating point LP, control for shifting the actual operating point AP is exerted as well as the control of the turbocharger 101.

Figure 10:
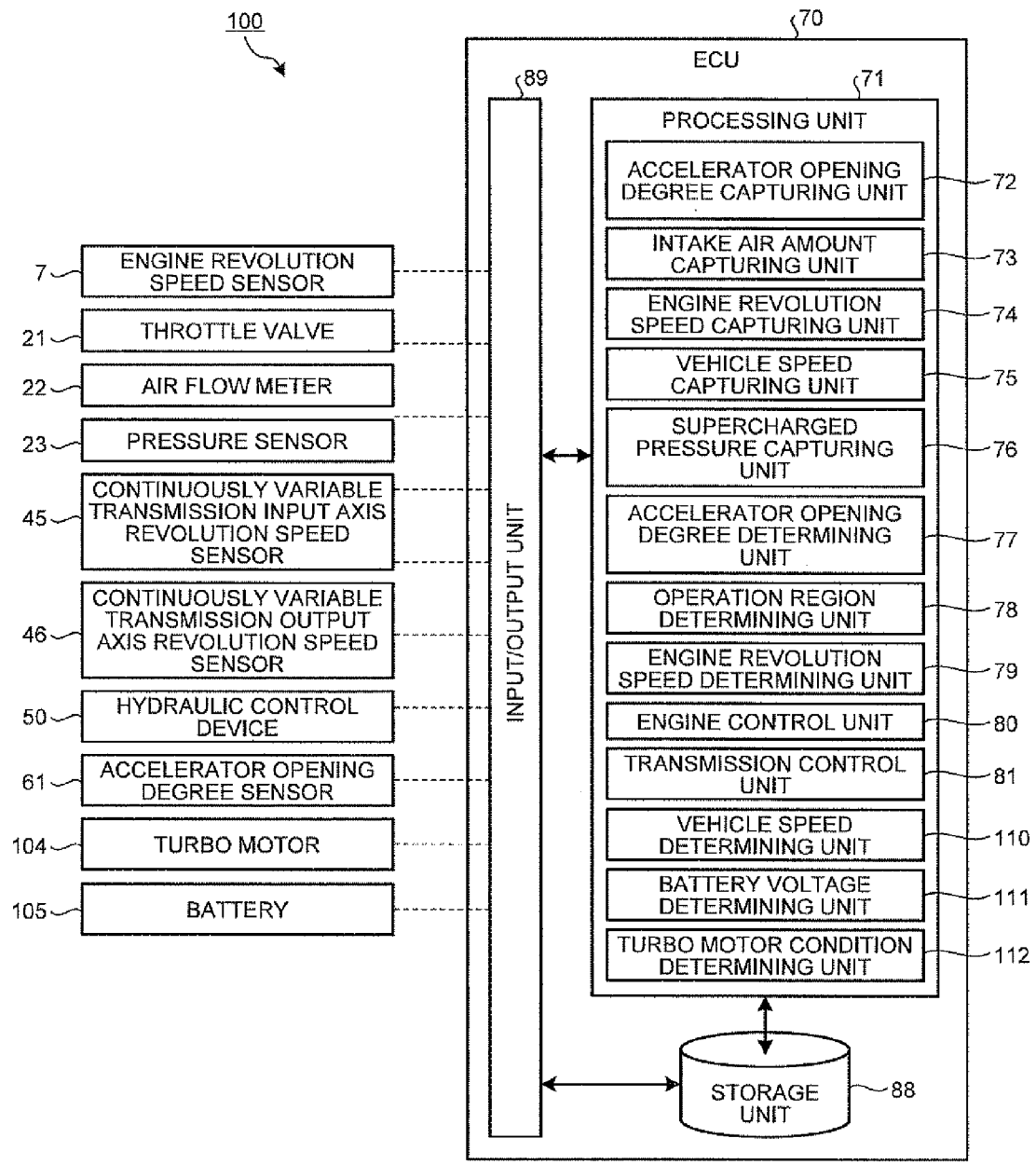
FIG. 10 is a view illustrating the configuration of the main part of the power control device illustrated in FIG. 9.

FIG. 10 is a view illustrating the configuration of the main part of the power control device illustrated in FIG. 9. In the power control device 100 according to the third embodiment provided as illustrated in these, the processing unit 71 of an ECU 70 includes an accelerator opening degree capturing unit 72, the intake air amount capturing unit 73, the engine revolution speed capturing unit 74, the vehicle speed capturing unit 75, the supercharged pressure capturing unit 76, the accelerator opening degree determining unit 77, the operation region determining unit 78, the engine revolution speed determining unit 79, the engine control unit 80, and the transmission control unit 81. In addition to these, the processing unit 71 includes: a vehicle speed determining unit 110, serving as a vehicle speed determining means, which determines vehicle speed based on the vehicle speed captured by the vehicle speed capturing unit 75; a battery voltage determining unit 111, serving as a power source voltage determining means, which compares the voltage of the battery 105 with a predetermined threshold value and determines a relation with the threshold value; and a turbo motor condition determining unit 112, serving as a turbo motor condition determining means, which determines whether the turbo motor 104 is malfunctioning.

Figure 11:
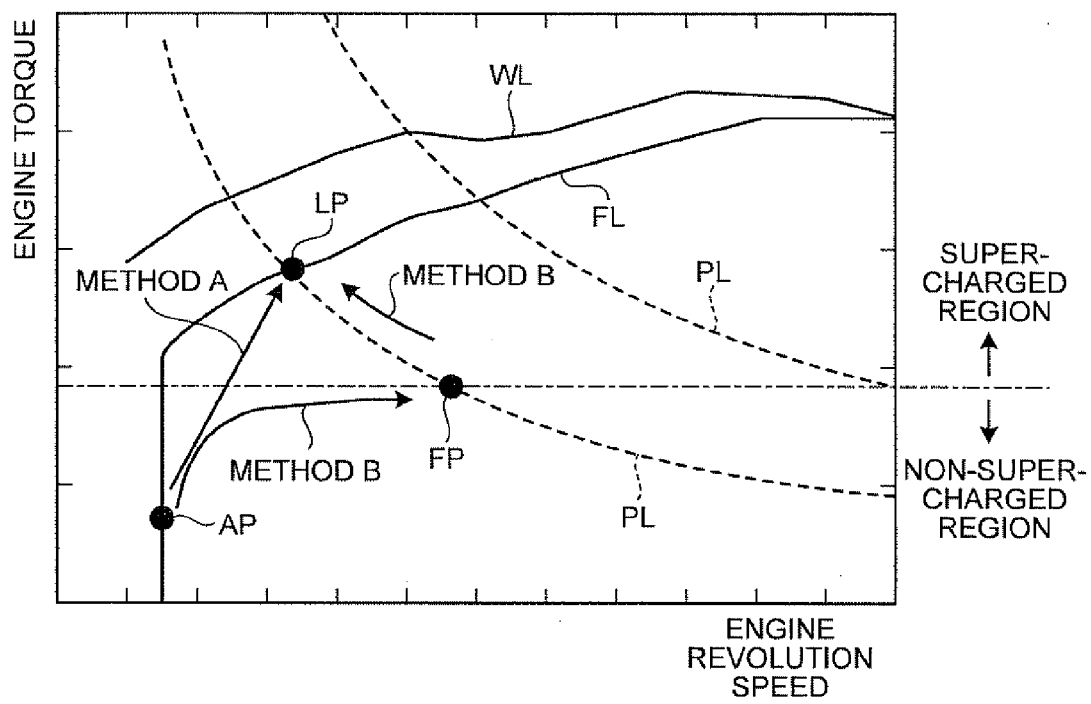
FIG. 11 is a view illustrating a method for shifting an actual operating point by use of a power control device according to the third embodiment.

FIG. 11 is a view illustrating a method for shifting an actual operating point by use of a power control device according to the third embodiment. The power control device 100 according to the third embodiment has the configuration described above, and its operation will now be described. In the power control device 100 according to the third embodiment, the turbocharger 101 is operable by means of electricity from the battery 105. While the turbo motor 104 is controlled by the engine control unit 80 of the processing unit 71 of the ECU 70, the turbo motor 104 and hence the turbocharger 101 are operated. Thereby, supercharging can be performed by the turbocharger 101 regardless of the operational status of the engine 5. That is, even when the operational status of the engine 5 is in a non-supercharging region, supercharging can be performed by operating the turbo motor 104. For this reason, to shift the actual operating point AP, which is located in a non-supercharging region at the time of acceleration of the vehicle, to the final target operating point LP, the turbo motor 104 may be operated to perform supercharging, thereby increasing engine torque, instead of shifting the actual operating point AP via the initial target operating point FP as in the power control device 1 according to the first embodiment.

In the power control device 100 according to the third embodiment, as described above, a number of methods can be used to shift the actual operating point AP to the final target operating point LP when the actual operating point AP is located in the non-supercharging region. However, the method is selected according to operational status of the accelerator pedal 60 or vehicle speed.

Figure 12:
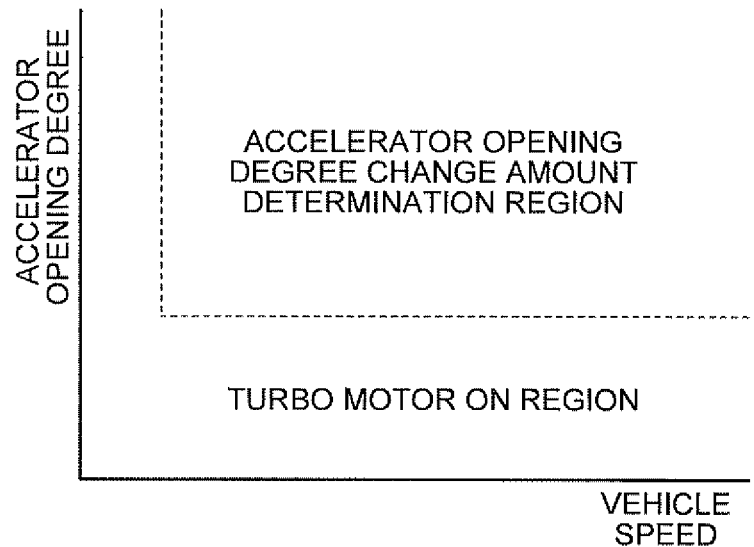
FIG. 12 is a diagram illustrating where the method is determined from vehicle speed together with the degree of opening of the accelerator when an actual operating point AP is shifted to the final target operating point LP.
Figure 13:
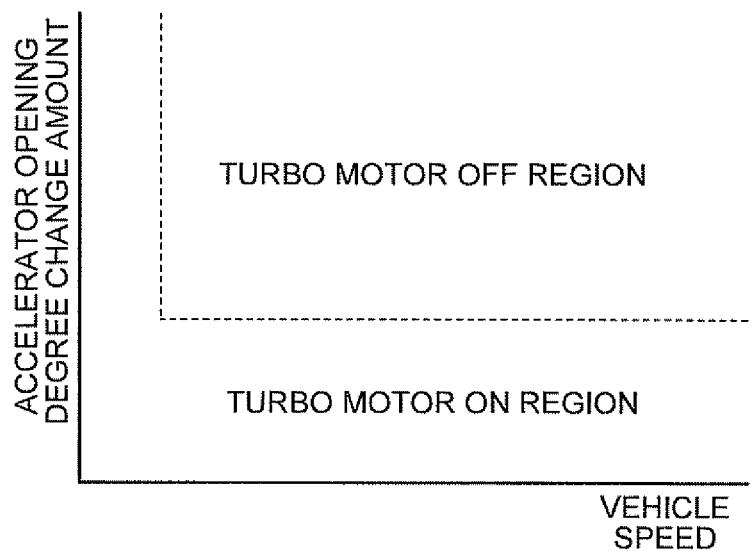
FIG. 13 is a diagram illustrating where the method is determined from vehicle speed together with an amount of change in degree of opening an accelerator when an actual operating point AP is shifted to the final target operating point LP.

FIGS. 12 and 13 are diagrams illustrating conditions for switching between methods when the actual operating point AP is shifted to the final target operating point LP. FIG. 12 is a diagram illustrating where the method is determined from vehicle speed together with the degree of opening of the accelerator, whereas FIG. 13 is a diagram illustrating where the method is determined from vehicle speed together with an amount of change in degree of opening the accelerator. For example, even if the degree of opening of the accelerator is small or large when the vehicle is accelerated in order to shift the actual operating point AP to the final target operating point LP, the accelerator pedal 60 is depressed slowly. If the amount of change is small when increasing the degree of opening of the accelerator, it is estimated that the driver does not require rapid acceleration.

For this reason, engine revolution speed is not greatly increased. However, as illustrated by the method A in FIG. 11, the actual operating point AP is directly shifted to the final target operating point LP, without passing though the initial target operating point FP. Moreover, if vehicle speed is low, engine revolution speed cannot be increased due to a low-speed transmission ratio set for the continuously variable transmission 35. Therefore, in this case also, the actual operating point AP is directly shifted to the final target operating point LP without passing through the initial target operating point FP, as illustrated by the method A in FIG. 11.

Thus, to shift the actual operating point AP by the method A, the turbo motor 104 is turned on and is operated with electricity supplied from the battery 105. Thereby the turbocharger 101 operates. Accordingly, even when the operational status of the engine 5 is in a non-supercharging region, the engine 5 is capable of taking in air while supercharging carried out by the turbocharger 101. Therefore, since the amount of intake air substantially increases, the engine torque becomes large and the actual operating point AP is shifted to the final target operating point LP.

That is, as illustrated in FIG. 12, when the degree of opening of the accelerator during acceleration is smaller than a predetermined degree, or when the vehicle speed is equal to a predetermined speed or lower, operational status falls into a turbo motor ON region. Additionally, if the amount of change in the degree of opening of the accelerator is smaller than a predetermined degree of opening of the accelerator even when the degree of opening of the accelerator is large, as illustrated in FIG. 13, the operational status falls into a turbo motor ON region. Thus, if the degree of opening of the accelerator and vehicle speed are located in the turbo motor ON region during acceleration of the vehicle when the actual operating point AP is located in the non-supercharging region, the turbo motor 104 is operated and the actual operating point AP is shifted to the final target operating point LP by the method A.

Conversely, if the degree of opening of the accelerator is large during acceleration of the vehicle and the amount of change in the degree of opening of the accelerator is large when the vehicle speed is equal to or higher than predetermined speed, it is estimated that a driver requires rapid acceleration. For this reason, in this case, the actual operating point AP is shifted to the final target operating point LP through the initial target operating point FP, as illustrated by the method B in FIG. 11.

To shift the actual operating point AP by the method B as described above, the turbo motor 104 is turned off, thus rendering the turbocharger 101 electrically inoperable. In this state, as in control by the power control device 1 according to the first embodiment, the transmission ratio of the continuously variable transmission 35 is increased to raise engine revolution speed, thereby shifting the actual operating point AP to the initial target operating point FP located on the power contour line PL of the final target operating point LP promptly. Thereafter, if supercharging becomes possible without electrically operating the turbocharger 101, engine revolution speed is decreased while engine torque is increased by supercharging. Thereby, the actual operating point AP is shifted to the final target operating point LP from the initial target operating point FP along the power contour line PL.

That is, as illustrated in FIG. 12, when the degree of opening of the accelerator and vehicle speed during acceleration are equal to or larger than a predetermined degree and equal to or larger than a predetermined speed, respectively, the operational status falls in an accelerator opening degree change amount determination region. As illustrated in FIG. 13, if the vehicle speed is higher than a predetermined speed and the amount of change in the degree of opening of the accelerator is equal to or larger than a predetermined amount in an accelerator opening degree change amount determination region, the operational status corresponding to the degree of opening of the accelerator and vehicle speed fall into a turbo motor-OFF region. When the degree of opening of the accelerator and vehicle speed fall in the turbo motor OFF region during acceleration where the actual operating point AP is located in a non-supercharging region, the turbo motor 104 is not operated, and the actual operating point AP is shifted to the final target operating point LP by the method B.

As described above, in the power control device 100 according to the third embodiment, if the actual operating point AP is shifted to the final target operating point LP when the actual operating point AP is located in a non-supercharging region, switching between the methods A and B is carried out according to the states of the accelerator pedal 60 and vehicle speed, and switching between the ON and OFF states of the turbo motor 104 is carried out according to the state of the accelerator pedal 60.

FIG. 14 is a flowchart illustrating the processing procedure in the power control device according to the third embodiment. Next, a method for controlling the power control device 100 according to the third embodiment, that is, the processing procedure in the power control device 100, will be described. When each unit is controlled during the running of the vehicle, the process below is called and performed every predetermined period. In the processing procedure in the power control device 100 according to the third embodiment, vehicle speed and an degree of opening of the accelerator are first captured by the vehicle speed capturing unit 75 and the accelerator opening degree capturing unit 72, respectively (step ST301). Next, based on the degree of opening of the accelerator captured by the accelerator opening degree detecting unit 72, the accelerator opening degree determining unit 77 determines whether the degree of opening of the accelerator has shifted further toward the opening side than previously (step ST302). If the accelerator opening degree determining unit 77 determines that the degree of opening of the accelerator has not shifted further toward the opening side than previously, the flow of processing departs from this procedure.

If the accelerator opening degree determining unit 77 determines that the degree of opening of the accelerator has shifted further to the opening side than previously (step ST302), the final target operating point LP is set (step ST303). This setting is carried out by the engine control unit 80. The engine control unit 80 calculates a power required for the engine 5 based on the vehicle speed captured by the vehicle speed capturing unit 75 and the degree of opening of the accelerator captured by the accelerator opening degree capturing unit 72. From the required power thus calculated and the map (see FIG. 11) of the optimal fuel consumption line FL and power contour line PL, the engine control unit 80 sets the final target operating point LP, which is an operating point at which the required power can be realized on the optimal fuel consumption line FL.

Subsequently, based on the operation region in which the actual operating point AP is located and the operation region in which the final target operating point LP is located, a operation region determining unit 78 determines whether the operation region of the engine 5 has been altered from the non-supercharging to the supercharging region (step ST304). If the operation region determining unit 78 determines that the operation region of the engine 5 has not been altered from a non-supercharging to a supercharging region, the flow of processing departs from this procedure.

Next, a determination is made whether or not the vehicle speed is in a low vehicle speed region (step ST305). This determination is performed by the vehicle speed determining unit 110 of the processing unit 71 of the ECU 70. If the vehicle speed captured by the vehicle speed capturing unit 75 is equal to or lower than a predetermined threshold value, the vehicle speed determining unit 110 determines that current vehicle speed is in a low vehicle speed region, and the flow proceeds to step ST309, which is described below. The threshold value of the vehicle speed used to determine whether the vehicle speed is within the low vehicle speed region is pre-set and stored in the storage unit 88 of the ECU 70, the reference speed being used to determine when using the vehicle speed whether the turbo motor 104 is operated or not to shift the actual operating point AP.

If the vehicle speed determining unit 110 determines that the vehicle speed is not in a low speed region (step ST305), that is, if the vehicle speed captured by the vehicle speed capturing unit 75 is greater than a predetermined threshold value, the determination is next made whether battery voltage is equal to or lower than a predetermined value or whether the turbo motor 104 is malfunctioning (step ST306). This determination is made by the battery voltage determining unit 111 of the processing unit 71 of the ECU 70 and the turbo motor condition determining unit 112. Of these units, the battery voltage determining unit 111 detects the voltage of the electrically charged battery 105, and determines whether it is equal to or lower than a predetermined value.

The turbo motor condition determining unit 112 compares the degree that the engine control unit 80 controls the turbo motor 104 with supercharged pressure captured by the supercharged pressure capturing unit 76. If the supercharged pressure captured by the supercharged pressure capturing unit 76 is not a value appropriate to the degree that the engine control unit 80 controls the turbo motor 104, the turbo motor condition determining unit 112 determines that the turbo motor 104 is malfunctioning. Specifically, the turbo motor condition determining unit 112 compares supercharged pressure estimated from the degree that the engine control unit 80 controls the turbo motor 104, with a supercharged pressure captured by the supercharged pressure capturing unit 76. If the difference between them is equal to or greater than a predetermined value, the turbo motor condition determining unit 112 determines that the turbo motor 104 is malfunctioning.

In addition, the predetermined value for the voltage of the battery 105 used for a determination by the battery voltage determining unit 111 is set in advance as a reference value for determining whether the charge in the battery 105 has decreased or not, and this predetermined value is stored in the storage unit 88 of the ECU 70. Similarly, the difference between the supercharged pressures, which is used by the turbo motor condition determining unit 112 to determine whether the turbo motor 104 is malfunctioning, is set in advance as a reference value for this determination, and is stored in the storage unit 88 of the ECU 70. If the battery voltage determining unit 111 and the turbo motor condition determining unit 112 determine that the battery voltage is equal to or lower than the predetermined value or the turbo motor 104 is malfunctioning, the flow proceeds to step ST310, which is described below.

If the battery voltage determining unit 111 and the turbo motor condition determining unit 112 determine that the battery voltage is higher than the predetermined value and the turbo motor 104 is not malfunctioning (step ST306), a determination is next made whether the degree of opening of the accelerator is equal to or higher than a predetermined value (step ST307). This determination is performed by the accelerator opening degree determining unit 77. The accelerator opening degree determining unit 77 compares the degree of opening of the accelerator captured by the accelerator opening degree capturing unit 72 with the predetermined value for the degree of opening of the accelerator stored in the storage unit 88 of the ECU 70 in advance, and determines whether the degree of opening of the accelerator captured by the accelerator opening degree capturing unit 72 is equal to or higher than this predetermined value. The predetermined value of the degree of opening of the accelerator stored in the storage unit 88 of the ECU 70 is set in advance as a reference value used for making the determination whether a driver requires rapid acceleration based on the degree of opening of the accelerator. If the accelerator opening degree determining unit 77 determines that the degree of opening of the accelerator is not equal to or higher than the predetermined value, the flow of processing moves to step ST309, which is described below.

If the accelerator opening degree determining unit 77 determines that the degree of opening of the accelerator is equal to or higher than the predetermined value (step ST307), the determination is next made whether the amount of change in the degree of opening of the accelerator is equal to or higher than a predetermined value (step ST308). This determination is performed by the accelerator opening degree determining unit 77. The accelerator opening degree determining unit 77 captures the amount of change in the degree of opening of the accelerator by obtaining continuously or at predetermined time intervals the degree of opening of the accelerator captured by the accelerator opening degree capturing unit 72. Furthermore, a comparison is made between the amount of change in the degree of opening of the accelerator thus captured and the predetermined value for the amount of change in the degree of opening of the accelerator, which is stored in advance in the storage unit 88 of the ECU 70. Then, the determination is made whether the amount of change in the degree of opening of the accelerator captured by the accelerator opening degree capturing unit 72 is equal to or higher than this predetermined value. The predetermined value of the amount of change in the degree of opening of the accelerator, stored in the storage unit 88 of the ECU 70, is set in advance as a reference value used for making the determination based on the amount of change in the degree of opening of the accelerator whether a driver requires rapid acceleration. If the accelerator opening degree determining unit 77 determines that amount of change in the degree of opening of the accelerator is equal to or higher than the predetermined value, the flow of processing goes on to step ST310, which is described below.

If the vehicle speed determining unit 110 determines that current vehicle speed is in a low speed region (step ST305), or if the accelerator opening degree determining unit 77 determines that the degree of opening of the accelerator is lower than the predetermined value (step ST307), or if this accelerator opening degree determining unit 77 determines that the amount of change in the degree of opening of the accelerator is not equal to or higher than the predetermined amount, that is, the amount of change in the degree of opening of the accelerator is smaller than the predetermined value (step ST308), the actual operating point AP is shifted by the method A (step ST309). That is, where vehicle speed is lower than the predetermined speed or where the degree of opening of the accelerator is smaller than the predetermined degree of opening, or where the amount of change in the degree of opening of the accelerator is smaller than the predetermined amount even when the degree of opening of the accelerator is larger than the predetermined degree of opening, the operational status during acceleration falls into a turbo motor ON region.

For this reason, to shift the actual operating point AP to the final target operating point LP, the engine control unit 80 controls the engine 5, thereby increasing engine torque, and the transmission control unit 81 controls the continuously variable transmission 35, thereby adjusting the engine revolution speed. Simultaneously with this, the turbo motor 104 is turned on, and the engine control unit 80 controls the turbo motor 104, thereby carrying out supercharging.

Thus, by operating the turbo motor 104 and carrying out supercharging by use of the electrically operated turbocharger 101, engine torque is increased by the supercharging carried out by the turbocharger 101, even if the actual operating point AP is located in the non-supercharging region. Accordingly, the actual operating point AP can be shifted to the final target operating point LP. Thereby, the actual revolution speed and torque of the engine 5 become equal to those at the final target operating point LP. Thus the engine 5 operates generating the required power while maintaining satisfactory fuel consumption.

Compared to this, if the vehicle speed determining unit 110 determines that current vehicle speed is not in a low speed region (step ST305), the accelerator opening degree determining unit 77 determines that the degree of opening of the accelerator is equal to or higher than a predetermined value (step ST307), and this accelerator opening degree determining unit 77 determines that the amount of change in the degree of opening of the accelerator is equal to or larger than a predetermined value (step ST308), the actual operating point AP is shifted by the method B (step ST310). That is, as described above, if vehicle speed is equal to or higher than the predetermined vehicle speed, the degree of opening of the accelerator is larger than the predetermined degree of opening, and the amount of change in the degree of opening of the accelerator is equal to or larger than the predetermined amount, the operational status during acceleration falls into the turbo motor OFF region. For this reason, to shift the actual operating point AP to the final target operating point LP, the turbo motor is turned off and the actual operating point AP is shifted without electrical operation of the turbocharger 101.

That is, to shift the actual operating point AP, the engine control unit 80 controls the engine 5 and, simultaneously with this, the transmission control unit 81 controls the continuously variable transmission 35, thereby increasing engine revolution speed. Thus, the actual operating point AP is shifted to the initial target operating point FP. Furthermore, when the actual operating point AP has reached the initial target operating point FP, the turbocharger 101 can be operated by exhaust gas. Therefore, while engine torque is increased by supercharging, engine revolution speed is decreased, thereby shifting the actual operating point AP to the final target operating point LP along the power contour line PL. Thereby, when the actual operating point AP has reached the final target operating point LP, the actual revolution speed and torque of the engine 5 have become equal to those at the final target operating point LP. Thus, the engine 5 operates generating the required power while maintaining satisfactory fuel consumption.

In the power control device 100 described above, the turbocharger 101 is provided with the turbo motor 104, and this turbocharger 101 can also be operated by electricity from the battery 105. Therefore, to shift the actual operating point AP to the final target operating point LP where the actual operating point AP is located in the non-supercharging region during acceleration of the vehicle, the turbo motor 104 is controlled by the engine control unit 80 according to the operational status of the vehicle. Thereby the turbocharger 101 is switched between exhaust gas operation only and electrical operation. This makes it possible to actualize the required driving force more reliably and to reduce electricity consumption when the turbocharger 101 is electrically operated. In other words, if the actual operating point AP is located in the non-supercharging region, and the amount of change in the degree of opening of the accelerator during acceleration of the vehicle is small, the actual operating point AP is shifted to the final target operating point LP by electrically operating the turbocharger 101, thereby increasing engine torque. Accordingly, even if the actual operating point AP is located in the non-supercharging region during acceleration of the vehicle, the actual operating point AP can be shifted to the final target operating point LP more reliably.

Conversely, if the amount of change in the degree of opening of the accelerator is large and the actual operating point AP is located in a non-supercharging region at the time of acceleration of the vehicle, the actual operating point AP is shifted to the initial target operating point FP by increasing engine revolution speed, and then shifted to the final target operating point LP. Accordingly, electricity consumption can be decreased. That is, when the amount of change in the degree of opening of the accelerator during acceleration of the vehicle is large even where the turbocharger 101 is provided so as to be electrically operable, the power of the engine 5 is increased by raising engine revolution speed without electrically operating the turbocharger 101. Accordingly, driving force required by a driver can be actualized while any increase in electricity consumption is suppressed. This makes it possible to more reliably obtain driving force during acceleration of a vehicle that uses, as a power source, the engine 5 equipped with the turbocharger 101 that is electrically operable. Additionally, providing an operational region where the turbo motor 104 is OFF can reduce electricity consumption.

Moreover, electricity consumption can be reduced even where the turbocharger 101 is provided with the turbo motor 104. Accordingly, the quantity of electricity to be generated can be reduced where the turbocharger 101 is electrically operable. This makes it possible to reduce load on an alternator (not illustrated), which generates electricity at the time of operation of the engine 5, thus reducing load on the engine 5 during operation. This suppresses degradation in fuel consumption where the turbocharger 101 is electrically operable.

Moreover, if the amount of change in the degree of opening of the accelerator is small, the actual operating point AP is shifted to the final target operating point LP by electrically operating the turbocharger 101. Accordingly, the vehicle can accelerate without discomfort to the driver. That is, when the amount of change in the degree of opening of the accelerator during acceleration is small, it is estimated that the driver has not required rapid acceleration. Therefore, in this case, the actual operating point AP is shifted to the final target operating point LP by electrically operating the turbocharger 101, thereby performing supercharging, and increasing engine torque. This makes it possible to prevent engine revolution speed from becoming higher than necessary. This makes it possible to reduce driver discomfort resulting from engine revolution speed increasing more than necessary when the driver has not required a rapid acceleration. In addition, if the amount of change in the degree of opening of the accelerator during acceleration of the vehicle is large, it is estimated that the driver may be requiring rapid acceleration. In this case, even when engine revolution speed is increased, the driver may not experience discomfort. As a result, driving force required by the driver can be actualized without causing discomfort to the driver during acceleration of the vehicle.

Moreover, when the actual operating point AP is shifted to the final target operating point LP, the state of the battery voltage or the state of the turbo motor 104 is determined. And, if the determination is made that the battery voltage is equal to or lower than a predetermined value or the turbo motor 104 is malfunctioning, the actual operating point is shifted using the method B. Accordingly, the actual operating point AP can be shifted more reliably. That is, in the method A, even when the actual operating point AP is located in the non-supercharging region, the actual operating point AP is shifted to the final target operating point LP by operating the turbo motor 104 to carry out supercharging with the turbocharger 101, thereby increasing engine torque. However, if the battery voltage is equal to or lower than the predetermined value or the turbo motor 104 is malfunctioning, the turbo motor 104 cannot be operated in the required state. This makes it impossible to carry out supercharging with the turbocharger 101, resulting in a hardly increased engine torque, which is difficult to use. As a result, if the actual operating point AP is located in the non-supercharging region, it is time-consuming to directly shift the actual operating point AP to the final target operating point LP.

Therefore, in the event that the turbo motor 104 cannot be operated in a required state due to decreased battery voltage or a malfunctioning turbo motor 104, the actual operating point AP is shifted using the method B in which the turbo motor 104 is turned OFF. This enables the actual operating point AP to reach the final target operating point LP promptly and more reliably. Accordingly, in vehicle that uses, as a power source, the engine 5 equipped with the turbocharger 101, securing driving force during acceleration of the vehicle can more reliably be made compatible with reducing degradation in fuel consumption.

Additionally, the power control devices 1, 90, and 100 according to the first to third embodiments differ from one another in terms of control for shifting the actual operating point AP. However, if the actual operating point AP is located in the non-supercharging region during acceleration of the vehicle, the control for shifting the actual operating point AP to the final target operating point LP may be a combination of the controls in the embodiments.

Moreover, the continuously variable transmission 35 in each of the power control devices 1, 90, and 100 described above is a belt type continuously variable transmission 35 capable of altering a transmission ratio continuously by altering the radius of rotation of the belt 43 wound around and between the primary pulley 41 and the secondary pulley 42. However, the continuously variable transmission 35 may be of a type other than the belt type. For example, any form of continuously variable transmission, such as a known toroidal type continuously variable transmission, may be used as long as the transmission is capable of altering a continuously when transmitting power from the engine 5 to the driving wheels.

Moreover, in each of the power control devices 1, 90, and 100 described above, the automatic transmission 30 has the continuously variable transmission 35, and gear change for power transmitted to the driving wheels 57 from the engine 5 can be continuously altered by the continuously variable transmission 35. However, the automatic transmission 30 may be provided with a step transmission device (not illustrated), and gear change may be carried out using this transmission device. In this case, to alter a transmission ratio, a gear speed capable of actualizing the transmission ratio closest to a desired transmission ratio is chosen from two or more gear speeds of different transmission ratios. For example, to shift the actual operating point AP to the initial target operating point FP, a gear speed is selected that is capable of bringing engine revolution speed closest to the engine revolution speed at the initial target operating point FP. Thus, if the actual operating point AP is located in a non-supercharging region during acceleration of the vehicle even where a step transmission device is used, a gear speed is selected that brings engine revolution speed closest to the engine revolution speed at a target operating point, such as the initial target operating point FP or final target operating point LP. Thereby, even if the actual operating point AP is located in a non-supercharging region during acceleration of the vehicle, the actual operating point AP can be shifted to the final target operating point LP at an early stage. Accordingly, in the vehicle that uses, as a power source, the engine 5 equipped with the turbocharger 15 or 101, securing driving force during acceleration of the vehicle can be made compatible with suppressing degradation in fuel consumption.

Additionally, in each of the power control devices 1, 90, and 100 described above, to increase engine revolution speed when shifting the actual operating point AP to the initial target operating point FP, the transmission ratio of the continuously variable transmission 35 is altered. However, instead of altering the transmission ratio of the continuously variable transmission 35, the engine revolution speed may be increased using other methods. For example, a power transmission path, which transmits power from the engine 5, may be provided with a friction type clutch (not illustrated) such that the clutch is normally engaged and is slid to increase the rotation of the engine 5. Thus, if the operational status of the engine 5 falls in the supercharging region by increasing engine revolution speed, supercharging can be carried out by the turbocharger 15 or 101, thus making it possible to secure power from the engine 5. Accordingly, even if the transmission efficiency of power temporarily falls as a result of sliding the clutch, the actual operating point AP can promptly be shifted to the final target operating point LP. As a result, there is less delay in acceleration of the vehicle.

INDUSTRIAL AVAILABILITY

As described above, the power control device according to the present invention is useful for an engine equipped with a turbocharger as a power source. In particular, the apparatus is appropriate where the transmission for changing the speed of power output from the engine is a continuously variable transmission capable of altering a gear-change ratio continuously.

The invention claimed is:

1. A power control device comprising:
   an engine provided as a power source for running a vehicle, equipped with a supercharger, and capable of supercharging using the supercharger; and
   a power control unit provided so as to control power of the engine and configured such that if an actual operating point, which is an operating point indicating a combination of actual revolution speed and torque of the engine, is located in a non-supercharging region, which is a region where supercharging cannot be carried out with the supercharger in an operation region of the engine, and if a target operating point, which is an operating point serving as a target during the acceleration, is located in a supercharging region, which is a region where supercharging can be carried out with the supercharger in the operation region of the engine, the revolution speed of the engine is increased while the torque of the engine is increased to a maximum in the non-supercharging region on a power contour line, which indicates the revolution speed and torque of the engine that actualize power equal to power at the target operating point, until the actual operating point is shifted into the supercharging region, thereby the actual operating point is shifted to a point at which the power contour line and the boundary between the non-charging region and charging region intersect, and the revolution speed of the engine is decreased after the actual operating point has entered the supercharging region, the revolution speed of the engine is decreased, thereby shifting the actual operating point into the target operating point when accelerating the vehicle.

2. The power control device according to claim 1, further comprising:
   an automatic transmission configured to change speed of power generated by the engine and output resultant power to driving wheels of the vehicle, wherein
   the power control unit shifts the actual operating point by controlling the revolution speed of the engine through controlling a transmission ratio for the automatic transmission while controlling the power of the engine.

3. The power control device according to claim 2, wherein if the revolution speed of the engine is equal to or higher than a permissible-noise revolution speed when the engine revolution speed is increased when the actual operating point is located in the non-supercharging area, the power control unit increases the engine torque with the engine revolution speed set to the permissible-noise revolution speed or lower, thereby shifting the actual operating point onto the power contour line indicating the revolution speed and torque of the engine that actualize power equal to the power at the target operating point, and then shifts the actual operating point to the target operating point, the permissible-noise revolution speed being an upper limit of a revolution speed capable of permitting noise that may increase with an increase in revolution speed of the engine.

4. The power control device according to claim 2, wherein if a pressure of air taken into the engine has become equal to or higher than a required supercharged pressure as the engine revolution speed increases when the engine revolution speed is being increased with the actual operating point located in the non-supercharging area, the power control unit increases the torque of the engine while maintaining the engine revolution speed at the actual operating point when the pressure of air taken into the engine has become equal to or higher than the required supercharged pressure, thereby shifting the actual operating point onto the power contour line indicating the revolution speed and torque of the engine that actualize power equal to the power at the target operating point, and then shifts the actual operating point to the target operating point, the required supercharged pressure being the pressure of air taken into the engine required to generate the engine torque at the target operating point.

5. The power control device according to claim 2, wherein the supercharger is provided so as to be operable by electricity, wherein if the actual operating point is located in the non-supercharging region and an amount of change in degree of opening of an accelerator pedal during the acceleration is small, the power control unit operates the supercharger by electricity and increases the engine torque, thereby shifting the actual operating point to the target operating point, and wherein if the actual operating point is located in the non-supercharging region and the amount of change in degree of opening of the accelerator pedal during the acceleration is large, the power control unit increases the engine revolution speed until the actual operating point shifts into the supercharging region.

6. The power control device according to claim 1, wherein if the revolution speed of the engine is equal to or higher than a permissible-noise revolution speed when the engine revolution speed is increased when the actual operating point is located in the non-supercharging area, the power control unit increases the engine torque with the engine revolution speed set to the permissible-noise revolution speed or lower, thereby shifting the actual operating point onto the power contour line indicating the revolution speed and torque of the engine that actualize power equal to the power at the target operating point, and then shifts the actual operating point to the target operating point, the permissible-noise revolution speed being an upper limit of a revolution speed capable of permitting noise that may increase with an increase in revolution speed of the engine.

7. The power control device according to claim 1, wherein if a pressure of air taken into the engine has become equal to or higher than a required supercharged pressure as the engine revolution speed increases when the engine revolution speed is being increased with the actual operating point located in the non-supercharging area, the power control unit increases the torque of the engine while maintaining the engine revolution speed at the actual operating point when the pressure of air taken into the engine has become equal to or higher than the required supercharged pressure, thereby shifting the actual operating point onto the power contour line indicating the revolution speed and torque of the engine that actualize power equal to the power at the target operating point, and then shifts the actual operating point to the target operating point, the required supercharged pressure being the pressure of air taken into the engine required to generate the engine torque at the target operating point.

8. The power control device according to claim 1, wherein the supercharger is provided so as to be operable by electricity, wherein if the actual operating point is located in the non-supercharging region and an amount of change in degree of opening of an accelerator pedal during the acceleration is small, the power control unit operates the supercharger by electricity and increases the engine torque, thereby shifting the actual operating point to the target operating point, and wherein if the actual operating point is located in the non-supercharging region and the amount of change in degree of opening of the accelerator pedal during the acceleration is large, the power control means increases the engine revolution speed until the actual operating point shifts into the supercharging region.

* * * * *